(12) United States Patent
Clark et al.

(10) Patent No.: US 7,548,489 B1
(45) Date of Patent: Jun. 16, 2009

(54) METHOD FOR DESIGNING A RESONANT ACOUSTIC PROJECTOR

(75) Inventors: Joseph A. Clark, Arlington, VA (US); Jane A. Young, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 69 days.

(21) Appl. No.: 11/482,296

(22) Filed: Jul. 5, 2006

(51) Int. Cl.
  *G01V 1/04* (2006.01)
  *H04R 1/00* (2006.01)
(52) U.S. Cl. .................................. 367/142
(58) Field of Classification Search ............... 367/141, 367/142, 152, 171, 172, 176, 154, 174, 153; 181/113, 120
  See application file for complete search history.

(56) References Cited

U.S. PATENT DOCUMENTS

| | | | | |
|---|---|---|---|---|
| 4,114,137 | A | * | 9/1978 | Mason et al. ............... 367/171 |
| 4,283,780 | A | * | 8/1981 | Nardi .......................... 367/82 |
| 4,651,044 | A | | 3/1987 | Kompanek |
| 5,126,979 | A | | 6/1992 | Rowe, Jr. et al. |
| 5,146,435 | A | | 9/1992 | Bernstein |
| 5,152,480 | A | | 10/1992 | Adams et al. |
| 5,214,620 | A | | 5/1993 | Rattner |
| 5,233,570 | A | * | 8/1993 | Donskoy ..................... 367/142 |
| 5,268,879 | A | | 12/1993 | Flanagan |
| 6,075,753 | A | | 6/2000 | Clark et al. |
| 6,137,390 | A | * | 10/2000 | Tung et al. ..................... 336/83 |
| 6,242,989 | B1 | | 6/2001 | Barber et al. |
| 6,438,242 | B1 | | 8/2002 | Howarth et al. |

(Continued)

FOREIGN PATENT DOCUMENTS

JP  2003337071 A * 11/2003

(Continued)

OTHER PUBLICATIONS

Jarng, "Comparison of Barrel-Stave Sonar Transducer Simulations Between a Coupled FE-BEM and ATILA", IEEE Sensors Journal, vol. 3, No. 4, Aug. 2001, pp. 439-446.*

(Continued)

*Primary Examiner*—Dan Pihulic
(74) *Attorney, Agent, or Firm*—Howard Kaiser

(57) ABSTRACT

Each of a pair of electrically conductive spiral coils is ensconced in a disk-shaped matrix. The two coil-ensconced matrices are joined face-to-face so as to sandwich between them a thin, non-magnetic elastic layer. An electronic device is connected so that each coil and a corresponding capacitor form an LC circuit. Electrification of the two LC circuits results in the departing and returning, in oscillatory fashion, of the two coil-ensconced matrices. This resonant behavior is both electromagnetic and mechanical in nature. The intermittent electromagnetic repelling is related to the LC circuitry and the oppositely polar electrifications of the respective coils. The springy mechanical activity is based on a spring-mass model and involves the elasticity of the intermediate material and the entrainment of ambient fluid. Underwater acoustic projection performance can be predicted by inputting design parameters in an algorithm inter-relating voltage input, electromagnetic behavior, mechanical behavior, and acoustic energy field output.

15 Claims, 17 Drawing Sheets

U.S. PATENT DOCUMENTS

| | | | |
|---|---|---|---|
| 6,570,819 B1 * | 5/2003 | Clark et al. | 367/142 |
| 6,707,210 B2 | 3/2004 | Hsieh | |
| 6,717,337 B2 | 4/2004 | Howarth et al. | |
| 6,798,122 B1 | 9/2004 | Howarth et al. | |
| 6,798,888 B1 | 9/2004 | Howarth et al. | |
| 6,960,968 B2 | 11/2005 | Odendaal et al. | |
| 7,443,764 B1 * | 10/2008 | Clark et al. | 367/142 |

OTHER PUBLICATIONS

Decarpigny, et al., "The Design of Low-Frequency Underwater Acoustic Projectors: Present Status and Future Trends", IEEE Journal of Oceanic Engineering, vol. 16, No. 1, Jan. 1991, pp. 107-122.*

U.S. Appl. No. 11/481,231, filed Jul. 5, 2006, title "Resonant Acoustic Projector," joint inventors Joseph A. Clark and Jane A. Young.

* cited by examiner

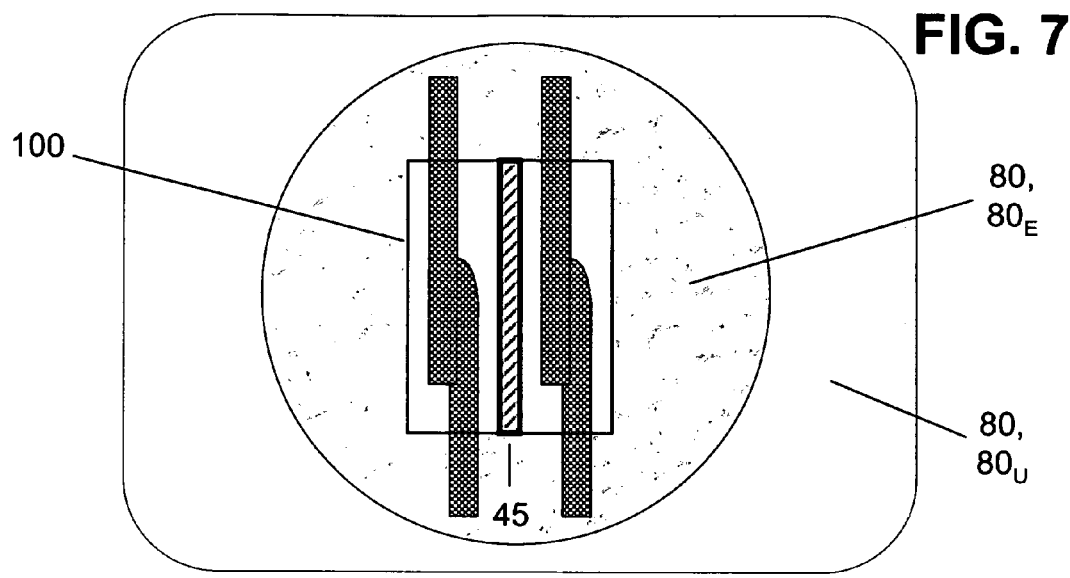
FIG. 7
FIG. 8
SPRING-MASS SYSTEM
$$\omega_{OM} = \sqrt{\frac{k}{m}}$$
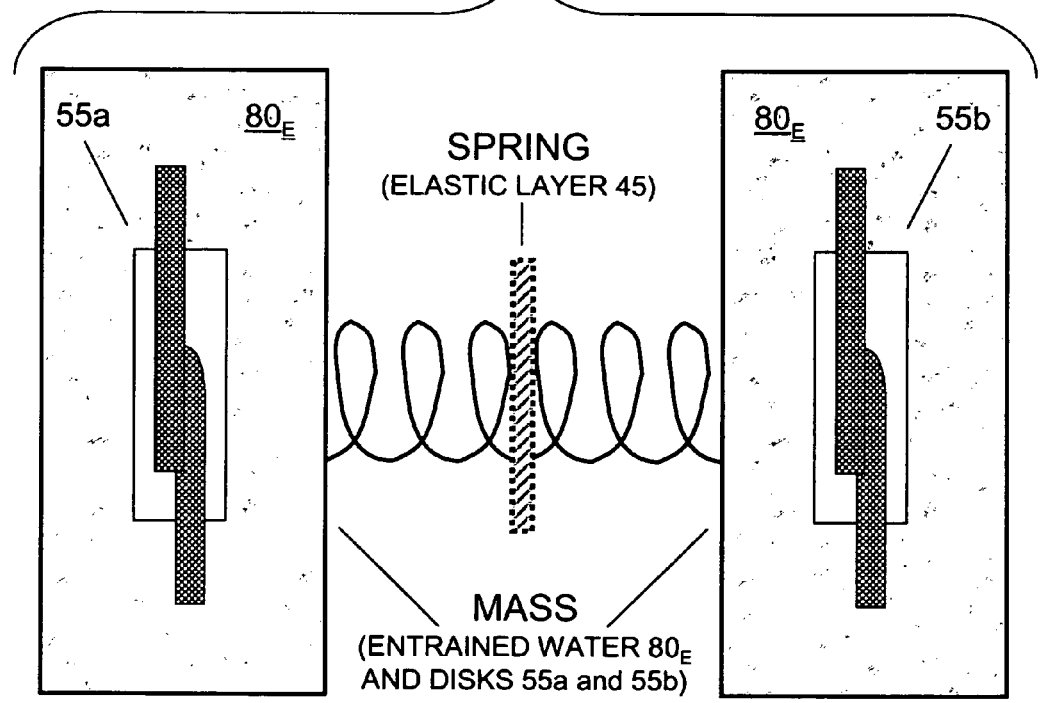

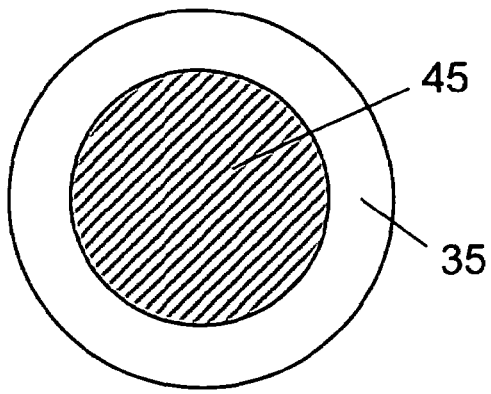
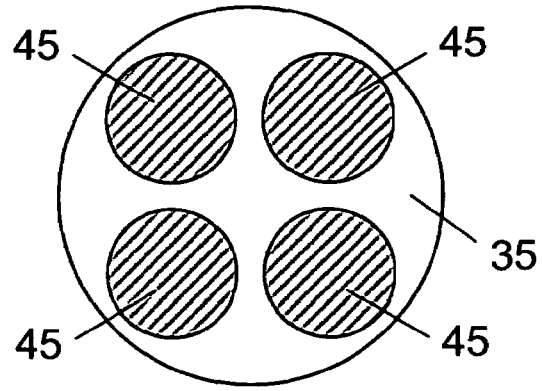
FIG. 9  FIG. 10
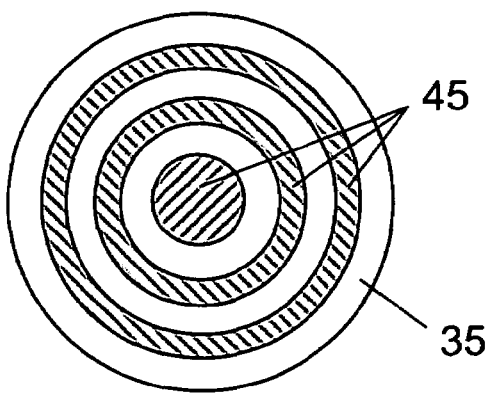
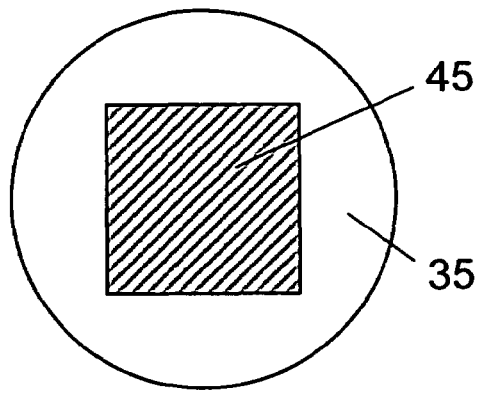
FIG. 11  FIG. 12
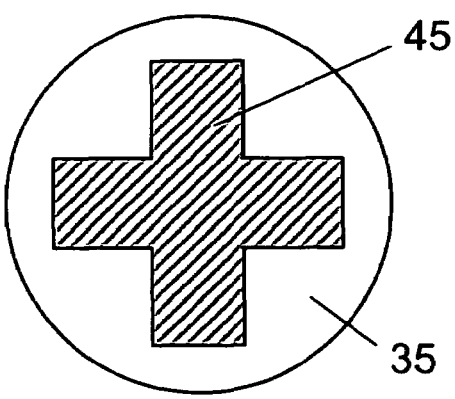
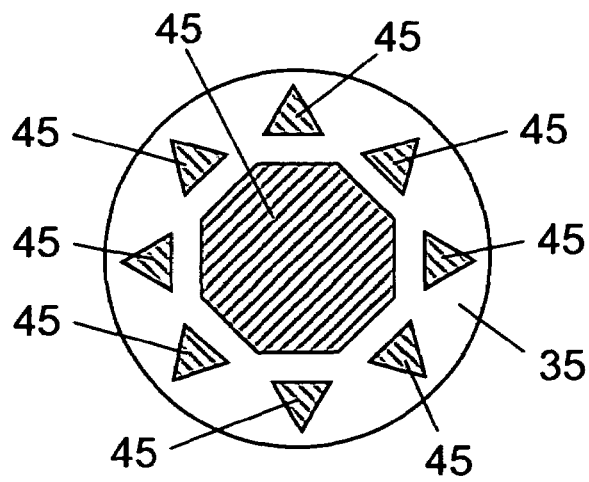
FIG. 13  FIG. 14

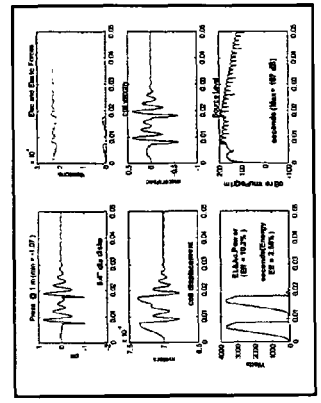
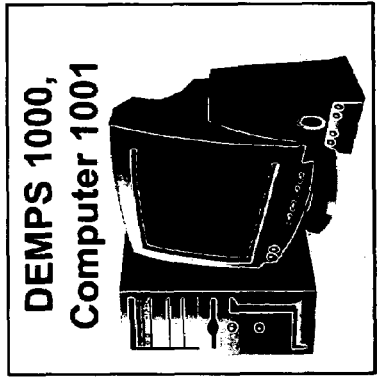

Given independent variables
Time of input signal
Driving voltage
Current Amplifier limiting level
Driving voltage frequency (Hertz)
Window on driving voltage
Wave form of driving voltage

Fixed circuit parameters
Number of turns in one coil
Permeability
Inductance factor
Initial disk separation
Electrical Resistance of each coil
Mechanical resistance of disk system
Radius of coil disk
Sound speed
Density
Wave number
Res. comp. of impedance
Mass of entrained fluid
Atmospheric pressure
Water depth
Spring constant of coils DEMPS 1000, Computer 1001

Driving Voltage
Response Current
Resistive Voltage
Feedback Voltage
Inductance
Inductive Voltage Acoustic Pressure in psi
Displacement
Electric & Electrostatic Forces
Coil Velocity
Acoustic Power & Efficiency
Source Level Plots

FIG. 15

Mathematical Coupled Equations

Electromagnetic Coupled Equation $$V(t) = C \int I dt + RI(t) + \frac{d}{dt}\{L(t)I(t)\};$$
$$L(t) = \mu_0 n^2 a(t)$$

$$\boxed{V(t) = C \int I dt + RI + \mu_0 n^2 a \frac{dI}{dt} + \mu_0 n^2 v I}$$

Mechanical Coupled Equation $$F(t) = Z_r A v(t) + \frac{d}{dt}\{m(t)v(t)\} = F_e(t) + F_m(t) - F_o$$

$$m(t) = \frac{\rho_0 A r_a(t)}{1 + k^2 r_a^2}, \quad F_e(t) = \mu_0 n^2 \frac{I^2(t)}{2}$$

$$F_m(t) = -sa(t) - R_m v(t), \quad F_0(z) = p_0(z) A$$

$$\boxed{F_e(t) - F_o(z) = sa + (z_r A + R_m + \frac{dm}{dt})v + m\frac{dv}{dt}}$$

FIG. 20

Impedance Equation $$Z_{spherical} = \rho c \left( \frac{k^2 r^2}{1+k^2 r^2} + \frac{ikr}{1+k^2 r^2} \right)$$

$$= \frac{\rho c k^2 r^2}{1+k^2 r^2} + \frac{i\rho c k r}{1+k^2 r^2}$$

$$= Z_r + Z_i$$

$$\boxed{k = \frac{\omega}{c} \Longrightarrow \omega = ck}$$

$$\boxed{Z_i = \frac{i\rho \omega r}{1+k^2 r^2}}$$

$$\boxed{m(t) = \frac{\rho_0 A r_a(t)}{1+k^2 r_a^2}}$$

$$\boxed{F_i = Z_i A v = \frac{\rho A r_a}{1+k^2 r^2} \cdot i\omega v = ma}$$

| | |
|---|---|
| $L$ | inductance of one coil |
| $V(t)$ | driving voltage |
| $R$ | electrical resistance |
| $C$ | electrical capacitance |
| $I(t)$ | current |
| $v = da/dt$ | velocity |
| $\mu_0$ | permeability of vacuum |
| $n$ | number of turns in one coil |
| $p_0$ | ambient pressure |
| $p_a$ | acoustic pressure |
| $v$ | particle velocity |
| $F$ | total force |
| $F_m$ | mechanical spring force |
| $s$ | spring constant |
| $F_e$ | electrical force |
| $Z_r$ | real impedance |
| $A$ | surface area of sphere with radius $r_a$ = radius of coil-containing disk |
| $m$ | mass of entrained fluid (reactive mass) |
| $k$ | wave number |
| $z$ | water depth |

FIG. 22

METHOD FOR DESIGNING A RESONANT ACOUSTIC PROJECTOR

STATEMENT OF GOVERNMENT INTEREST

The invention described herein may be manufactured and used by or for the Government of the United States of America for governmental purposes without payment of any royalties thereon or therefor.

CROSS-REFERENCE TO RELATED APPLICATIONS

This application is related to the U.S. patent application Ser. No. 11/481,231, now U.S. Pat. No. 7,443,764, filing date 5 Jul. 2006, incorporated herein by reference, entitled "Resonant Acoustic Projector," inventors Joseph A. Clark and Jane A. Young.

BACKGROUND OF THE INVENTION

The present invention relates to acoustic projectors, more particularly to acoustic projectors for producing pressure waves in fluidic environments, such as may be suitable for underwater sonar applications.

Various types of acoustic projectors have been used for producing pressure waves in fluids, including those based on piezoelectric and electromagnetic (EM) principles. Piezoelectric projectors tend to be fragile due to their ceramic construction, and require power conversion electronics (which can be heavy, bulky and costly) to permit high-voltage-low-current powering such as delivered by batteries and some power amplifiers. The so-called "boomer" electromagnetic projectors, used in oil and gas exploration, can only be used at or just beneath water surfaces, and generate sounds that reach water bottoms at much reduced levels due to spreading losses. A conventional "boomer" EM projector avails itself of the low atmospheric pressure in order to produce a large cavitation bubble that collapses, thereby producing a transient underwater pulse the level of which decays in amplitude in accordance with $1/r^2$, where r is the distance in meters away from the source.

The present inventors previously disclose, in their U.S. Pat. No. 6,570,819 B1, issued 27 May 2003, entitled "Low Frequency Acoustic Projector," incorporated herein by reference, an electromagnetic (EM) acoustic projector that produces pressure waves in fluids. As their '819 acoustic projector is typically embodied, two pancake-shaped spiral-wound, electrically conductive wire coils (made, e.g., of copper) are spaced slightly apart (e.g., ⅛ inch or less), parallel to each other. Each spiral-wound wire coil is encapsulated in a shell (made, e.g., of a fiberglass resin). A ring (made, e.g., of an epoxy) encircles the planar junction between the two encapsulated spiral-wound wire coils, and is flexibly attached to each encapsulated spiral-wound wire coil via, for instance, plural flexible bands (made, e.g., of a rubber material such as silicon or urethane). Voltage is applied across one end of each spiral-wound wire coil so that currents of opposite polarities flow in the two spiral-wound wire coils. The resultant magnetic forces cause the two encapsulated spiral-wound wire coils to repel each other (when current flows in the coils) and to come back to each other (when current does not flow in the coils) in accordance with the periodicity of the electrical excitation. For a sinusoidal electrical excitation of given drive frequency, the resultant oscillation (vibration) is at a frequency that is twice the drive frequency, since the magnetic forces are always repulsive regardless of the polarity (i.e., in negative sinusoidal cycle versus in positive sinusoidal cycle) of the sinusoidal electrical excitation. The flexible bands together with the hydrostatic water pressure maintain proximity of the coils, exerting restorative forces when current does not flow in the coils.

The above-described EM acoustic projector of U.S. Pat. No. 6,570,819 is quite useful but tends to be limited at greater water depths, e.g., at depths below twenty feet. The amount of power required for operation of a '819 acoustic projector will tend to increase, in accordance with increasing water depth, toward an impractical limit. That is, the '819 acoustic projector's effectiveness will be delimited by a prohibitive water depth, at or below which the '819 acoustic projector's electromagnetic resonance will become insufficient to overcome the increased hydrostatic pressure concomitant with the increased water depth.

SUMMARY OF THE INVENTION

In view of the foregoing, it is an object of the present invention to provide an acoustic projector that is capable of projecting sounds at desired acoustic levels (e.g., intensities) at practically all water depths, both shallow and deep.

In accordance with typical embodiments of the present invention, an underwater acoustic projection device comprises two coil-containing disks and an elastic layer therebetween. Each coil-containing disk includes a spiral-wound electrical coil and a disk-shaped shell encapsulating the spiral-wound electrical coil. The elastic layer adjoins the disk-shaped shells. Capacitance means is electrically connected to the spiral-wound electrical coils so that the capacitance means and the spiral-wound electrical coils are constituents of inductance-capacitance ("LC") circuitry. The spiral-wound electrical coils constitute inductance means in the inductance-capacitance circuitry. While the underwater acoustic projection device is submerged in water, the inductance-capacitance circuitry is electrically powered so that the inductance-capacitance circuitry effects electromagnetic resonance of the underwater acoustic projection device, and so that a spring-mass system effects mechanical resonance of the underwater acoustic projection device. The underwater acoustic projection device and a portion of the water are constituents of the spring-mass system. The elastic layer constitutes the spring in the spring-mass system. The water portion is in the vicinity of, and entrained by, the resonant underwater acoustic projection device so as constitute nearly all of the mass in the spring-mass system. The underwater acoustic projection device produces pressure waves in the water in association with the electromagnetic resonance and the mechanical resonance. As the present invention is frequently practiced, the inductance-capacitance circuitry and the spring-mass system are mutually tuned so that, during the electrical powering of the inductance-capacitance circuitry, the electromagnetic resonance and the mechanical resonance occur at the same frequency. The mutual tuning can include, for instance, adjustment of one or more of the following parameters: (i) the electrical powering (e.g., amount) of the inductance-capacitance circuitry; (ii) the material composition and/or shape and/or dimensions (e.g., size) of one or both disk-shaped shells; (iii) the material composition and/or shape and/or dimensions (e.g., size) of the elastic layer.

The acoustic projector in accordance with the present invention bears some similarity to the aforementioned acoustic projector of U.S. Pat. No. 6,570,819. Both acoustic projectors feature a coreless electromagnetic design and produce coherent, low frequency, high source-level underwater acoustic waves. However, a significant distinction between the '819 acoustic projector and the present invention's acoustic projector is that the former effect an electromagnetic resonance system only, whereas the latter effects, typically in tandem, both an electromagnetic resonance system and a mechanical resonance system. The dual resonance of the inventive acoustic projector (as distinguished from the sole resonance of the '819 acoustic projector) significantly increases the underwater depth range in which efficient operation is feasible.

As typically embodied, the present invention's acoustic projector features a thin, non-magnetic, elastic layer, which is made of a natural elastomeric material (e.g., natural rubber) or a synthetic elastomeric material (e.g., polyurethane, polyurea or other polymeric material). The elastic layer can consist of a single piece or of plural discrete pieces, as inventive practice admits of multifarious shapes and patterns described by the elastic layer. Accordingly, the term "layer," as used herein to describe the elastic material in the context of inventive practice, broadly refers to any form of elastic material, continuous or discontinuous, that describes, or generally or approximately describes, a geometric form characterized by uniform thickness. The elastic layer is closely situated between two encapsulated, spiral-wound, electrically conductive coils that are similar to those disclosed by the present inventors in their U.S. Pat. No. '819.

The present invention uniquely combines mechanical resonance with electromagnetic resonance. The present invention's electromagnetic resonance is similar to that which is taught by the present inventors in their U.S. Pat. No. '819. LC (inductance-capacitance) circuitry is formed by the connection of the coils (which act as inductors) with the amplifier (which includes one or more capacitors). The present invention's mechanical resonance is associated with the "spring-mass system" that is formed by the combination including the two coil-containing disks, the elastic layer, and the entrained water mass. The elastic layer, situated between the two-coil-containing disks, acts in combination with the hydrostatic water pressure to exert restorative forces so as maintain proximity of the coils. Furthermore, of greater significance as pertains to the mechanical resonance aspect of the present invention, the elastic layer acts as the "spring" in what effectively represents a spring-mass system. According to typical underwater applications of the present invention, the mass in the spring-mass system is largely constituted, or practically entirely constituted, by the "entrained" water, which is the portion of the surrounding water that falls into synchronous oscillation with the elastic layer and the coil-containing disks.

The present invention features, inter alia, the unique combination of electromagnetic resonance (via the LC circuitry) with mechanical resonance (via the spring-mass system). Typical inventive embodiments seek to optimize this combination by coordinating the respective oscillatory frequencies of the two kinds of resonance (viz., electromagnetic resonance and mechanical resonance); the electromagnetic resonance and mechanical resonance thus, in a sense, "join forces." An important inventive objective is thus for the electromagnetic resonant frequency and the mechanical resonant frequency to equate with each other. According to typical inventive practice, the LC circuitry (which is a form of frequency-selective electric circuitry) and the elastic layer (which is the "spring" in the spring-mass system) are "tuned" with respect to each other so that the electromagnetic resonant frequency of the electrified coils (which is twice the frequency applied via the LC circuitry, if electrification is sinusoidal) "matches" the mechanical resonant frequency ("natural" frequency) of the spring-mass system. The dual oscillatory modes are merged at the same frequency through tuning of either or both of the two oscillatory modes. According to inventive synchronization of electromagnetic and mechanical resonances, the electromagnetic resonance involves oscillation, back and forth, between capacitance (storage of electrical energy) and inductance (storage of magnetic energy); in parallel fashion, the mechanical resonance involves oscillation, back and forth, between potential energy and kinetic energy.

The present invention is typically embodied as an acoustic projector that produces pressure waves underwater. The present invention's acoustic projector as typically embodied produces an underwater acoustic wave characterized by high efficiency, coherency, low frequency, narrow bandwidth, and high acoustic source level. Inventive practice can achieve enhanced electro-acoustic efficiencies at high powers and at a wide range of depths of operation. Electrical current produced by a signal amplifier (which, typically, is connected to and receives its power from a direct current power source) passes through each coil in opposing directions, creating opposing magnetic fields. Based on the "Lenz Effect," mechanical forces are generated directly by the opposing electrical currents in the two coils, and without the use of any magnetic core material. The inductance of the coil is coupled with capacitance (at least one capacitor, such as included in a power amplifier) to produce a tunable LC electrical circuit. Elastic ("spring-like") material is used between the coils to produce a tunable spring-mass system in which mechanical resonance is associated with the mass of the entrained water and the spring constant of the elastic material. Either or both of the mechanical circuit (spring-mass system) and the electrical circuit (LC circuit) are tuned. Both the mechanical and electrical circuits are driven with a high current, low voltage, low-resistance power source, such as a battery or a current mode amplifier (e.g., one that incorporates fast solid state switching technology). Inventive practice will frequently benefit from low electrical circuit resistance, a consideration that suggests the inventive implementation of switching-type power amplifiers that operate optimally at low driving voltages and high currents. For instance, based on numerical studies, design specifications have been identified by the present inventors for an inventive acoustic projector that is characterized by ultra low resistance and that generates an 800 Hz toneburst at a 208 dB source level with 77% efficiency when used in association with a low voltage, high current switching amplifier.

Through its mechanical resonance "build-up" process, the present invention's acoustic projector is typically capable of utilizing a small amount of input power to produce high acoustic source levels. The resonance starts out slowly because the input power is low, but gradually builds up to its optimal frequency—i.e., where the electromagnetic resonant frequency and the mechanical resonant frequency are one and the same frequency. Generally speaking, the "natural frequency" of an elastic object or system is the frequency at which such object or system, once energized, will freely vibrate. Part of this "build-up" process involves an increase in an amount of water that is entrained by the inventive acoustic projector while the inventive acoustic projector continues to resonate. During an initial period, the resonance is entirely or primarily electromechanical in nature; gradually, more and more water is entrained by the overall resonance at a given resonant frequency (which equals the mechanical resonant frequency of the spring-mass system) as the overall resonance increasingly becomes characterized by mechanical resonant behavior in addition to the electromagnetic resonant behavior with which it is initiated at the same resonant frequency. When the preset invention's spring-mass system is completely energized, it completely "finds" its mechanically resonant frequency (natural frequency). The present invention's mechanical resonance thereby joins with the present invention's electromagnetic resonance to strengthen the resonance (vibration or oscillation) significantly beyond that which is generated by the present inventors' '819 acoustic projector, which relies solely on electromagnetic resonance. The finer the tuning of the mechanical resonance and the electromagnetic resonance with respect to each other, the greater the efficiency of this electrical-to-mechanical power transfer.

The present invention's acoustic projector uses elastic material to create a resonant spring-mass behavior, whereas the present inventors' '819 acoustic projector does not; therefore, in contrast to typical embodiments of the present inventors' '819 acoustic projector, typical embodiments of the inventive acoustic projector work well at greater depths, e.g., at depths below twenty feet. The present invention's water depth versatility also stands in contrast to conventional "boomer" piezoelectric acoustic projectors, which are positioned at or just below the water surface. In some ocean environments, only a small amount of energy from a pulse generated at/near the surface will reach the bottom, due to the sound velocity profile (SVP) bending of the sound up towards the surface. Since the present invention can be used in deep water (even at the water bottom), the noise level entering the bottom layer of the body of water is much higher. In addition, there is less distortion in the receiving signal, since the sound source is closer to the bottom. Moreover, the present invention typically uses less power and operates at a lower source level, the latter being environmentally advantageous for marine mammals (e.g., whales, dolphins, porpoises, seals, walruses, sea lions, manatees, dugongs, polar bears) that are sensitive to loud underwater noise. Furthermore, the present invention typically provides a coherent, ultra repeatable signal, transient or steady state, which can be beneficial for signal processing.

Conventional low frequency underwater acoustic projectors operate in the 30 Hz-1 kHz range. The present invention's acoustic projector can be embodied as suitable for underwater use inside and/or outside of this frequency range. As compared with conventional low frequency acoustic projectors, the present invention's acoustic projector can be embodied as a very small device that is capable of producing high source levels of low frequency sound. In order to be used with a battery (direct current power source), a conventional piezoelectric projector requires complicated electrical circuitry and heavy transformers to transform the power to a high voltage and low current; some power is lost in this transformation, and space is needed for the electronics. The present invention obviates power conversion electronics, thus simplifying design and reducing weight and space. The present invention's acoustic projector can be manufactured inexpensively and can be utilized as a battery-operated, throw-away device. One inventive acoustic projector can be used, or plural (e.g., multiple) inventive acoustic projectors can be used in combination with one or more other inventive acoustic projectors in an array. Nor is the inventive device's utility relegated to acoustic projection, as it can be embodied, for instance, as a mechanical shaker.

The present invention also provides a method, a system, and a computer program product, for modeling underwater acoustic projection apparatus. The inventive methodology typically comprises defining plural component parameters, defining plural operation parameters, and determining the amount of sound radiated by the inventive underwater acoustic projection apparatus. The component parameters relate to the components of the inventive underwater acoustic projection apparatus. The component parameters include: the number of turns in each spiral-coiled electrical conductor; the electrical resistance of each spiral-coiled electrical conductor; the spring constant of the elastic component; the separation between the matrices in the absence of operation of the underwater acoustic projection apparatus; and the radius of each matrix. The operation parameters relate to operation of the inventive underwater acoustic projection apparatus. The operation parameters include: the amount of voltage input; the water depth of the inventive underwater acoustic projection apparatus; and the mass of the entrained water. The determination of the amount of sound includes using the defined component parameters and the defined operation parameters in an eclectic mathematical relationship. This eclectic mathematical relationship includes the voltage input, the electromagnetic resonance, the mechanical resonance, and the sound radiated by the inventive underwater acoustic projection apparatus.

According to the inventive design methodology as typically practiced, the components include a capacitance component, two inductance components, and an elastic component. Each inductance component includes a matrix and a spiral-coiled electrical conductor embedded in the matrix. The elastic component is interposed between and abuts the matrices. The capacitance component is electrically connected to the spiral-coiled electrical conductors in inductance-capacitance circuitry in which the capacitance component represents the capacitance and in which the spiral-coiled electrical conductors represent the inductance. During operation of the inventive underwater acoustic projection apparatus, voltage input into the inductance-capacitance circuitry results in oscillation toward and away from each other of the two inductance components. This oscillation is associated with electromagnetic resonance the inductance-capacitance circuitry and with mechanical resonance of a spring-mass system in which the elastic component represents the spring and in which the entrained water represents at least substantially all of the mass. The underwater acoustic projection apparatus produces pressure waves in the water in association with the electromagnetic resonance and the mechanical resonance. The pressure waves are associated with sound radiated by the inventive underwater acoustic projection apparatus.

Performance of an inventive acoustic projector can thus be inventively predicted by inputting design parameters in an algorithm that inter-relates voltage input, electromagnetic behavior, mechanical behavior, and acoustic energy field output. As the inventive design methodology is frequently practiced, the inventive practitioner repeats the steps of defining the component parameters, defining the operation parameters, and determining the amount of sound, each repetition changing at least one defined component parameter and/or at least one defined operation parameter. Based on information obtained via this iterative process pertaining to respective amounts of sound radiated by the inventive underwater acoustic projection apparatus, the inventive practioner can select a complete set of parameters consisting of a subset of component parameters and a subset of operation parameters.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 2, FIG. 3 and FIG. 4 show the disks and elastic layer in plan view, elevation view and perspective view, respectively.

FIG. 6 also illustrates the tunable electromagnetic (EM) resonance system that is associated with the inductor-capacitor (LC) circuitry that is realized by the connection between the inventive acoustic projection device and the amplifier.

FIG. 7 is an elevation view (similar to the view of FIG. 6) of an embodiment of an inventive acoustic projection device such as shown in FIG. 5, particularly illustrating the entrainment of some surrounding water by a submerged inventive acoustic projection device that is in an oscillatory state.

FIG. 8 is a schematic illustrating a spring-mass system constituted by the combination shown in FIG. 7, which includes the oscillating inventive acoustic projection device and the water mass entrained thereby.

FIG. 9 through FIG. 14 are similar plan views of various embodiments of an elastic layer in accordance with the present invention. Each elastic layer embodiment is shown adjoining one coil-containing disk (with the coil not shown) for illustrative purposes, but is understood to be adjacently interposed between a pair of coil-containing disks.

FIG. 15 is a schematic of a typical acoustic projector design methodology in accordance with the present invention's design methodology.

FIG. 20 is a schematic illustrative of the mathematical relationship, in accordance with the present invention's design methodology, between the electromagnetic circuit and the mechanical circuit.

FIG. 22 is a table of some mathematical variables in accordance with the present invention.

DETAILED DESCRIPTION OF THE INVENTION

Figure 3:
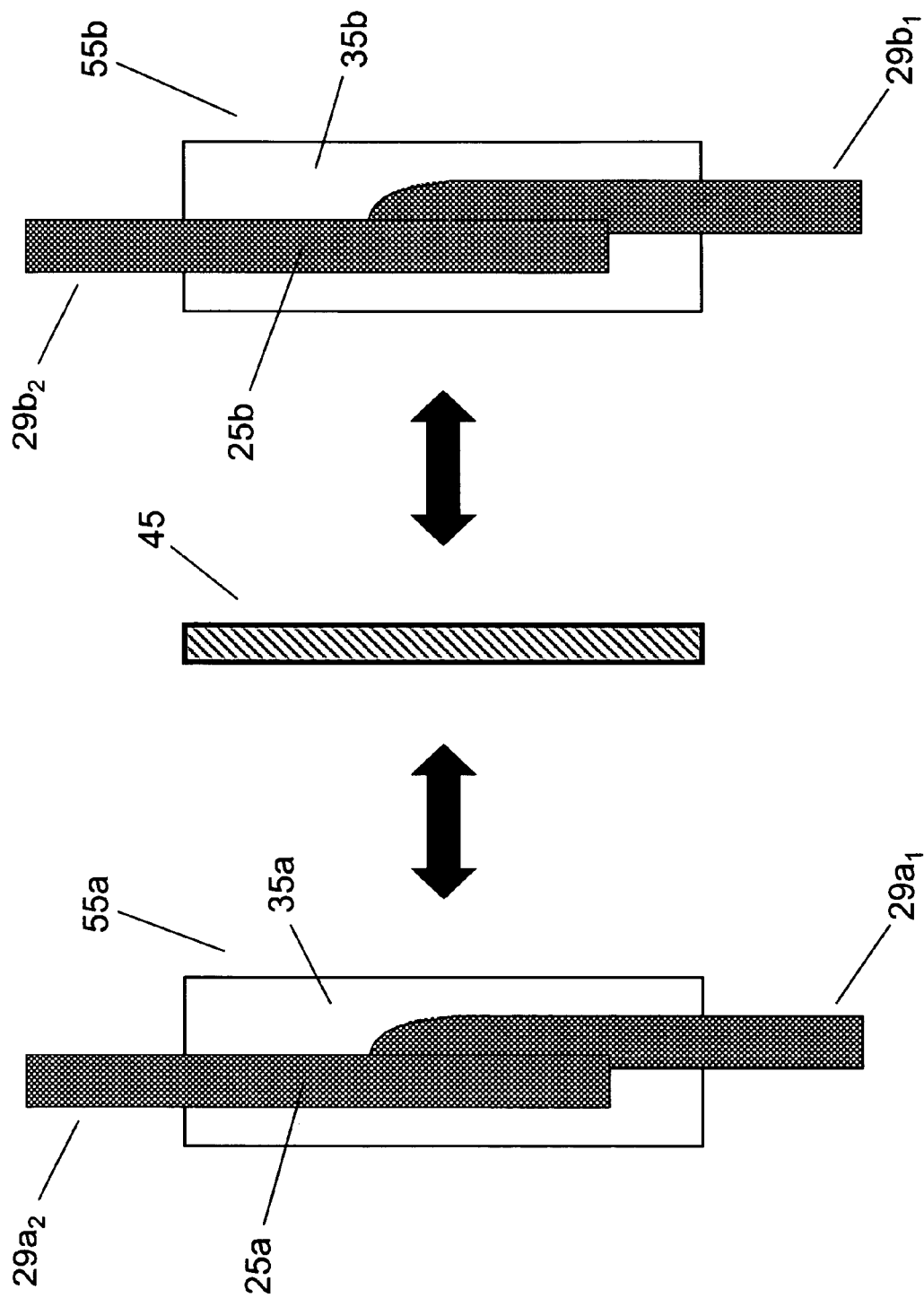
Figure 4:
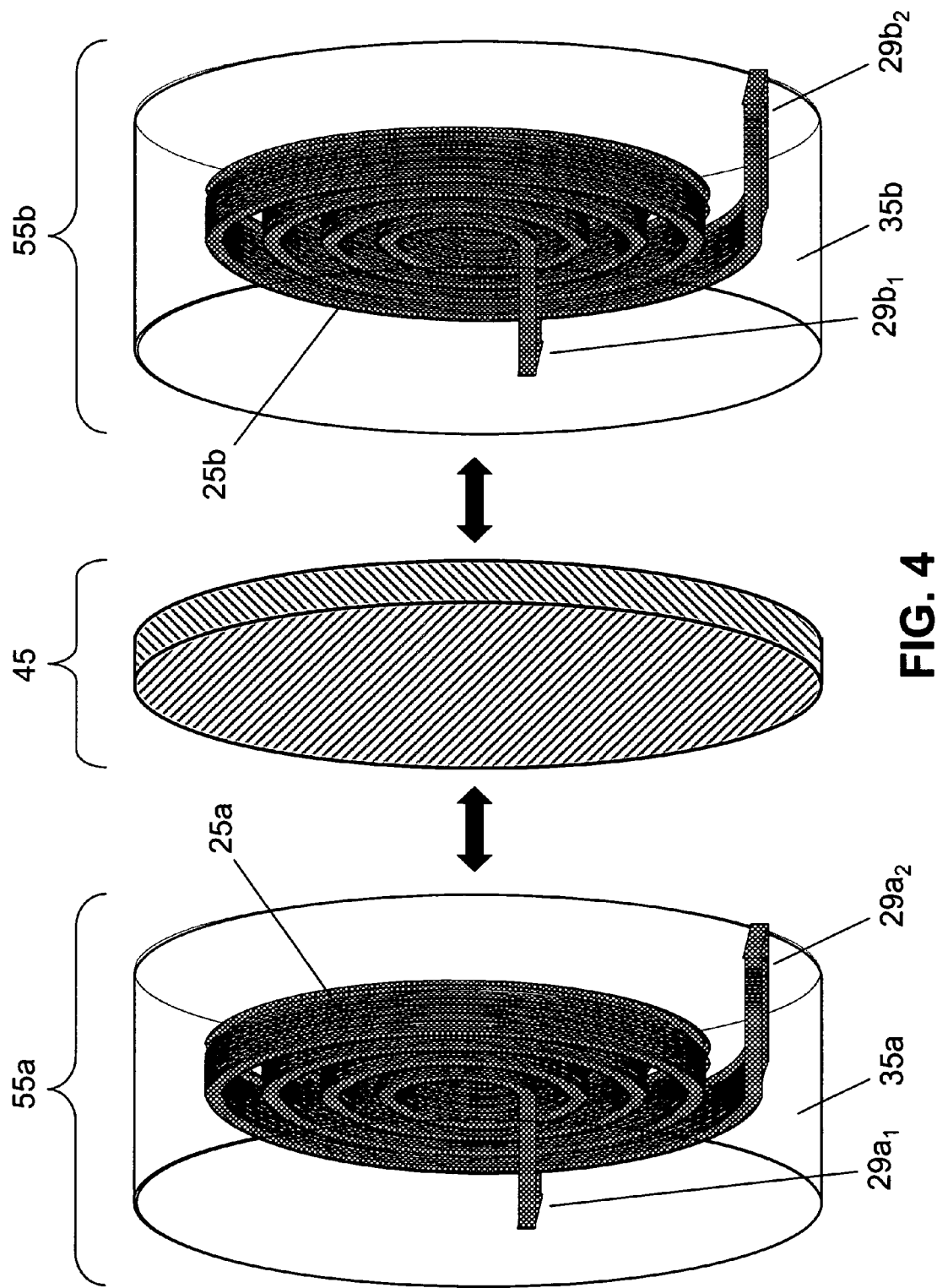
Figure 5:
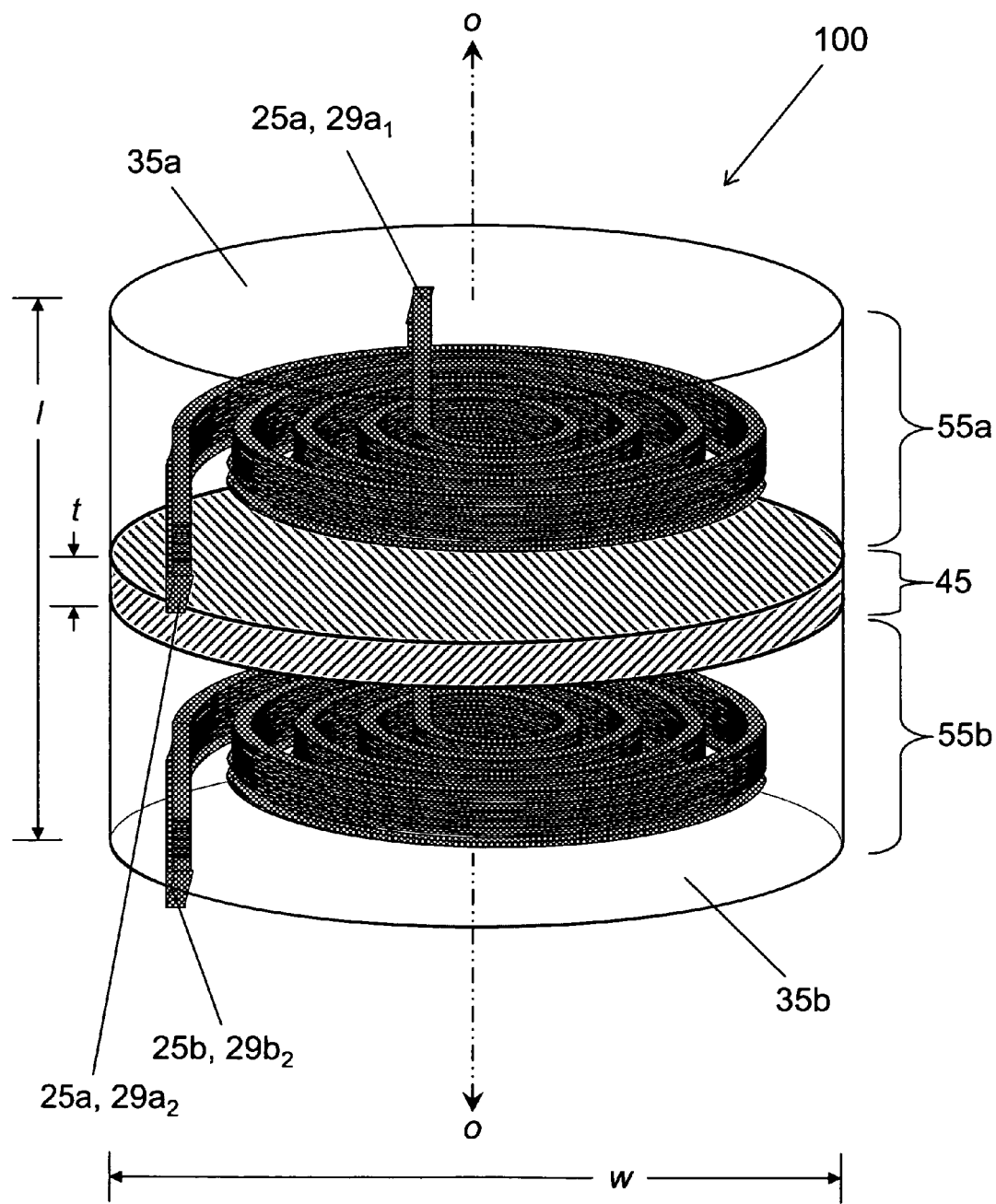
FIG. 5 is a perspective view of a typical embodiment of an acoustic projection device in accordance with the present invention, such as has been fabricated via an inventive method that includes the steps illustrated in FIG. 1 and in each of FIG. 2 through FIG. 4.

Reference is now made to FIG. 1 through FIG. 5, which illustrate the fabrication of an acoustic projection device 100 in accordance with the present invention. The completely assembled inventive acoustic projector 100 is depicted in FIG. 5.

Figure 1:
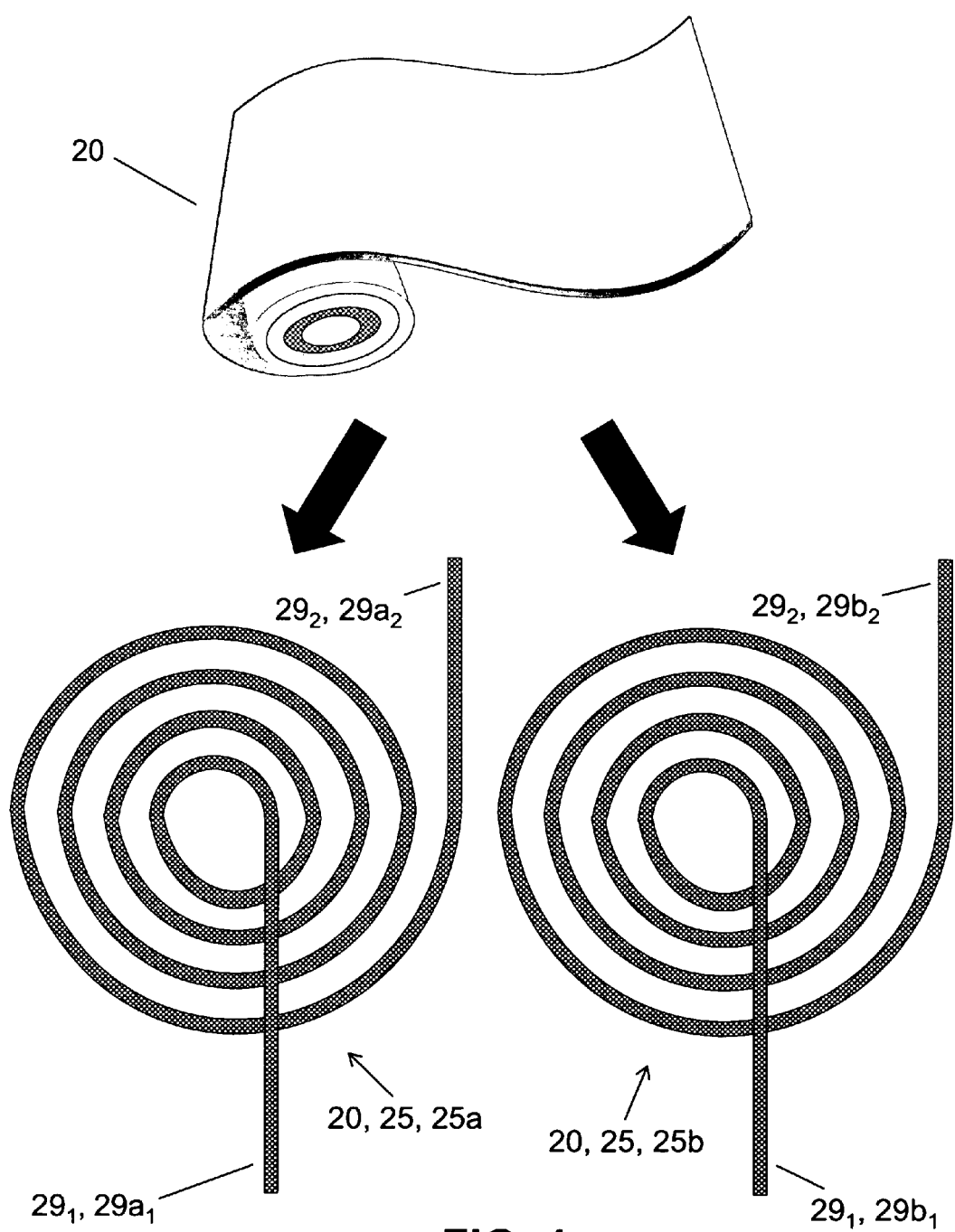
FIG. 1 is a schematic illustrating the winding of electrically conductive metal (e.g., copper or aluminum) sheet material (perspective view) into two congruous coils (plan view) in accordance with a typical embodiment of the present invention.
Figure 2:
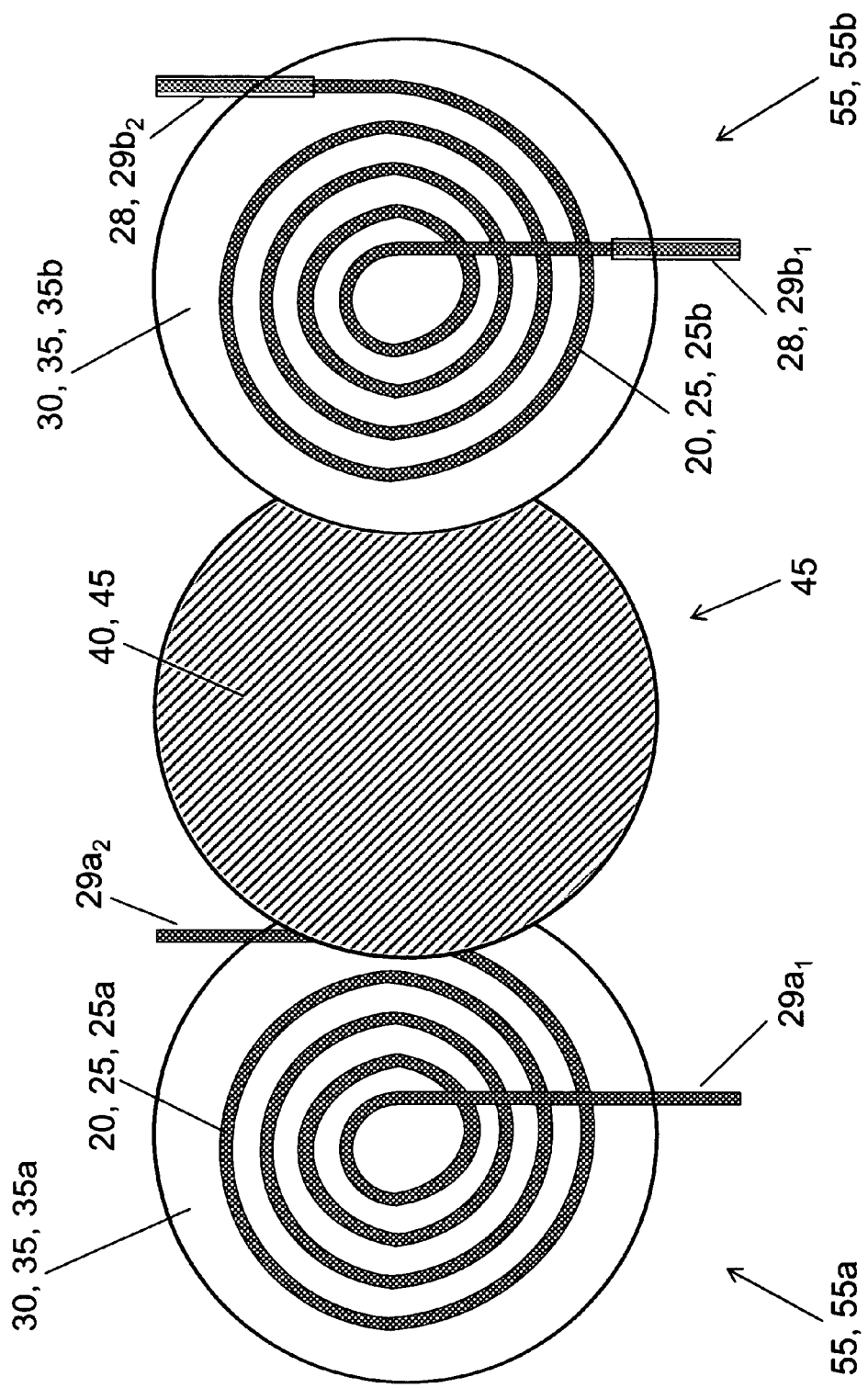
FIG. 2, FIG. 3 and FIG. 4 are each a schematic illustrating the combining of two congruous coil-containing disks with an elastic layer therebetween in accordance with a typical embodiment of the present invention.
Figure 6:
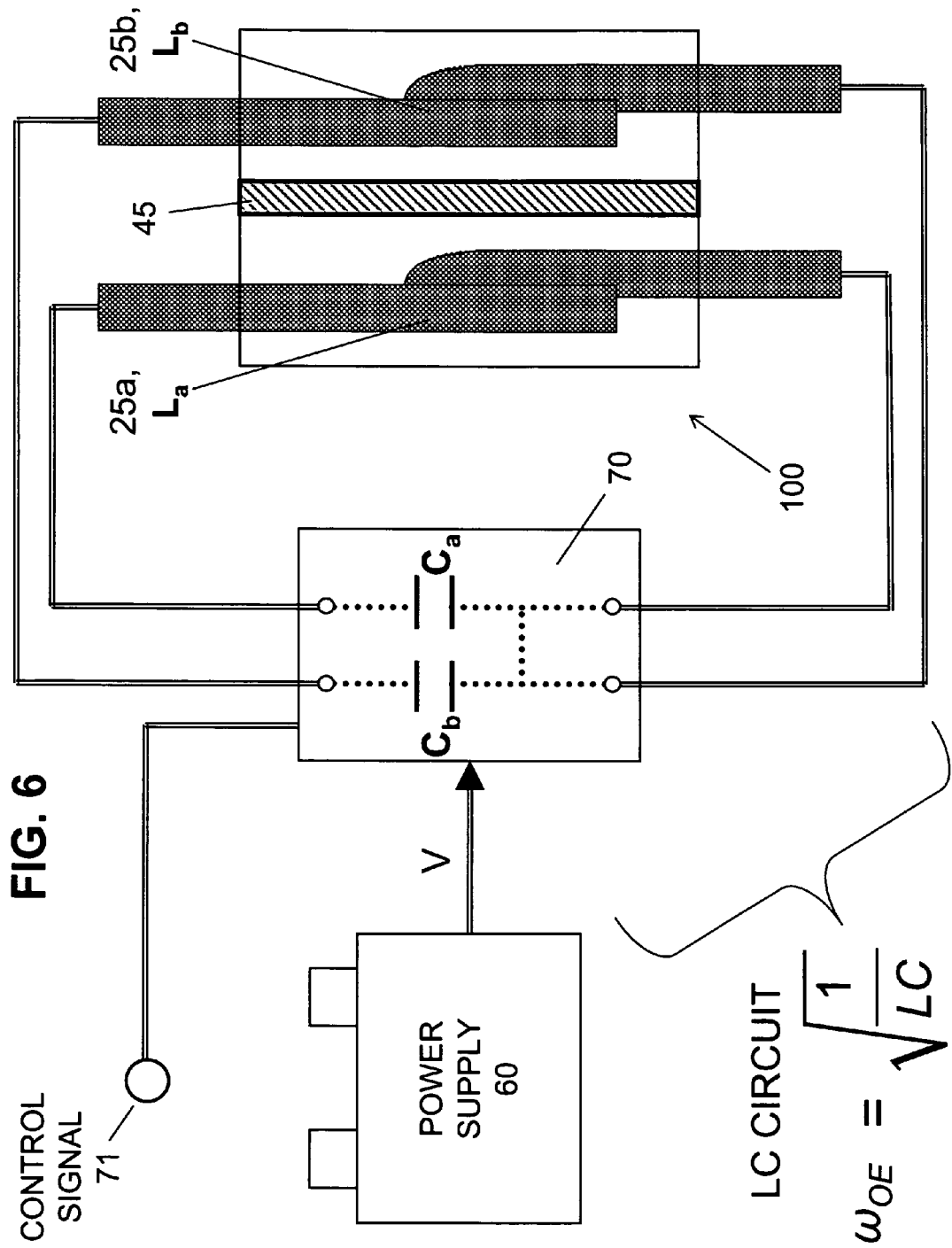
FIG. 6 is a schematic of an embodiment of an acoustic projection apparatus in accordance with the present invention. The inventive acoustic projection apparatus shown in FIG. 6 includes an electrical power source, an amplifier, and an inventive acoustic projection device (elevation view) such as shown in FIG. 5.

As shown in FIG. 1, thick electrically conductive sheet material 20 (such as copper, aluminum, gold, silver, etc.) is wound in a spiraling manner into two congruous coils 25, viz., spiral-wound coils 25a and 25b. Each spiral-wound coil 25 has two ends 29, viz., an inwardly originating end $29_1$ (which extends from a radially innermost area of the spiral) and an outwardly originating end $29_2$ (which extends from a radially outermost area of the spiral). Thus, spiral-wound coil 25a has ends $29a_1$ and $29a_2$; spiral-wound coil 25b has ends $29b_1$ and $29b_2$. According to usual inventive practice, each coil 25 is insulated (e.g., covered with an electrically insulating material 28 such as shown in FIG. 2). Typically, the end segments/portions 29 of each coil 25 are covered with a thicker layer of insulation as compared with the rest of coil 25 in order to maintain a sufficiently small voltage difference for avoiding a breakdown that may be associated with a larger voltage difference. Each end 29 serves as a lead for connecting to electronic apparatus in a manner such as illustrated in FIG. 6.

Although each of coils 25a and 25b is shown in FIG. 1, FIG. 2, FIG. 4 and FIG. 5 to describe four turns, depending on the inventive embodiment the coils 25 can be spiral-wound with practically any plural number of turns. As typified by inventive practice, the two coils 25a and 25b are shown to be "congruous" insofar as being composed of the same electrically conductive material and describing the same or approximately the same geometry (e.g., in terms of width, thickness, number of turns); however, such congruity may be departed from in some inventive embodiments. Although the electrically conductive coils 25 are shown as constituting sheet material 20 (which is wide and flat), in inventive practice practically any wire shape is possible for coils 25. Use of sheet-configured electrically conductive material 20 for winding the coils 25 may be of benefit due to the possible higher current and/or lower electrical resistance and/or lower inductance associated therewith, especially when the coils 25 are wound fewer numbers of times.

Most inventive embodiments provide for the embedding of coils 25 in a matrix material (e.g., an epoxy resinous material) 30 to house and protect the coils 25 as well as to attribute them with a structural form that is more suitable for combination with an elastic material 40 and for effectuation of the pressure-wave-producing resonant behavior. As shown in FIG. 2 through FIG. 4, each coil 25 is encapsulated in a disk-shaped shell 35 that is composed of a matrix material 30. Shells 35a and 35b describe at least approximately the same disk shape having at least approximately the same dimensions. Shells 35a and 35b are shown in some of the figures herein to be optically transparent or translucent for illustrative purposes only, as shells 35a and 35b are not necessarily so for inventive practice. Each combination inclusive of a coil 25 and a shell 35 is referred to herein as a "coil-containing disk 55." Coil-containing disk 55a includes coil 25a and shell 35a; coil-containing disk 55b includes coil 25b and shell 35b. In the light of the instant disclosure, the ordinarily skilled artisan will appreciate the various known techniques (such as involving casting or molding of plastic materials) that the inventive practitioner can bring to bear for encapsulating a coil 25 in a shell 35 so as to make a coil-containing disk 55.

By "disk" shape is broadly meant herein a cylindrical, approximately cylindrical, or generally cylindrical geometric shape having a relatively short axial length, e.g., shorter than its diameter. A disk shape can be purely cylindrical in a geometric sense, or can be approximately or generally so, for instance having edges, corners or surfaces that are smoothed, contoured, faired, linear, curvilinear or curved, e.g., for hydrodynamic or other purposes. In inventive practice, a coil-containing disk 55 or a disk-shaped shell 35 can define a pure or nearly pure flattened geometric cylinder, or can merely resemble a flattened geometric cylinder. A disk-shaped shell 35 can have, for instance, an outside (exposed) face describing a shape that is uneven or that exhibits convexity or concavity or than has a rim or that otherwise deviates from geometric planarity. The circumferential shape described by a disk-shaped shell 35 can be polygonal or oval or can otherwise deviate from geometric circularity. The benefit of a disk shape for shell 35 (and, hence, for coil-containing disk 55) will reside, not it its geometric cylindricality per se, but in its geometric concordance with the spiral shape of the coil 25 contained therein, and in its geometric suitability for oscillating according to inventive principles. Diverse shapes, disk or non-disk, of the two shells 35a and 35b are possible in inventive practice.

The two shell 35 shapes should be such as to be capable of creating pressure waves in its fluid environment while in an oscillatory state, the two coil containing disks 55a and 55b repeatedly moving together and apart, typically in accordance with an exact frequency selected by the inventive practitioner. Each coil 25 should be firmly ensconced in its shell 35, without any looseness or slackness whatsoever, so that when the coil 25 moves its shell 35 moves precisely as does coil 25. Insulation of end portions 29 may be especially recommended for underwater applications; the insulating material 28 should be coextensive at least with the portions of the coils 25 that protrude outside the shell 35, thereby insulating these protrusive coil 25 portions from the aqueous environment.

Variously shown in FIG. 2 through FIG. 4 is the contiguous placement of a non-magnetic elastic layer 45 intermediate the two coil-containing disks 55a and 55b. The present invention's elastic layer 45 can be composed of any of multifarious non-magnetic elastic materials 40. The elastic material 40 can be any non-magnetic material, natural or synthetic (e.g., polymeric), having elastic (e.g., viscoelastic) physical character, regardless of whether it includes at least one non-magnetic non-elastic material such as may be incorporated therein for at least one enhancement purpose. A variety of elastomers can be inventively practiced, including but not limited to natural rubber, silicon, urethane (e.g., polyurethane), polyurea, etc. Elastic layer 45 can be composed of one elastic material or of two or more elastic materials. The elastic material can be a pure elastomer, or a combination of pure elastomers, or a composite such as a fiber-reinforced elastomeric matrix composite material.

Inventive practice typically provides for the application of elastic layer 45 through a known technique such as involving molding, casting, spraying or bonding. For instance, elastic layer 45 can be applied to a surface or surfaces of one or both coil-containing disks 55 using a conventional technique such as involving spraying or casting of an uncured polymeric substance. Alternatively, elastic layer 45 can consist of one or more cured polymeric "inserts" or "stick-ons" that are adhered between the two coil-containing disks 55. Regardless of the inventive fabrication method, inventive practice usually prefers the contiguous arrangement of the two coil-containing disks and the elastic layer 45 therebetween.

The completed inventive acoustic projector 100 depicted in FIG. 5 includes three abutting sections, viz., the two coil-containing disks 55a and 55b and the elastic layer 45 directly between them. Coils 25a and 25b define respective imaginary geometric planes that are parallel to each other and to the imaginary geometric plane defined by the elastic layer 45. In a sense, inventive acoustic projector 100 represents a composite material system having a "sandwich" construction in which the two extreme non-elastic (rigid) layers, viz., coil-containing disks 55a and 55b, sandwich the relatively thin intermediate elastic layer 45. Typical embodiments of inventive acoustic projector 100 are less than one foot in length l and less than one foot in width (e.g., diameter) w, the elastic layer 45 being less than one inch in thickness t. When used in association with electronic apparatus such as illustrated in FIG. 6, the inventive acoustic projector 100 manifests oscillatory behavior back-and-forth in opposite directions as indicated by bidirectional arrow o, which is shown in FIG. 5 to be coincident with the longitudinal axis of inventive acoustic projector 100. The oscillation of the two coil-containing disks 55a and 55b is toward and away from each other in the direction of bidirectional arrow o, which is perpendicular to each of the imaginary geometric planes defined respectively by coil 25a, coil 25b and elastic layer 45.

With reference to FIG. 6, electrical (e.g., dc) electrical current from a power supply (e.g., battery) 60 is conveyed to a signal amplifier 70, which is connected to spiral-wound coil 25a at its ends $29a_1$ and $29a_2$ and to spiral-wound coil 25b at its ends $29b_1$ and $29b_2$. Signal amplifier 70 includes capacitors $C_a$ and $C_b$. Capacitor $C_a$ is connected in a loop with coil 25a; capacitor $C_b$ is connected in a loop with coil 25b. The combination of capacitor $C_a$ and coil 25a constitutes LC circuit "$L_aC_a$," wherein coil 25a represents inductor $L_a$. Similarly, the combination of capacitor $C_b$ and coil 25b constitutes LC circuit "$L_bC_b$," wherein coil 25b represents inductor $L_b$.

Voltage V from power supply 60 feeds each of the LC circuits $L_aC_a$ and $L_bC_b$. Each LC circuit can be understood to be either a series LC circuit or a parallel LC circuit. The respective electrifications of LC circuits $L_aC_a$ and $L_bC_b$ are in opposite polarities; that is, one LC circuit is electrified in positive polarity and the other LC circuit is electrified in negative polarity. Amplifier 70 includes or is associated with an electrical control signal input 71, which controls the electrical powering of the LC circuits $L_aC_a$ and $L_bC_b$. Electrification of the LC circuits $L_aC_a$ and $L_bC_b$ causes coils 25a and 25b (and hence, coil-containing disks 55a and 55b) to alternately repel each other and return to each other in a manner according with the electromagnetic phenomenon known as the "Lenz effect." The intermittent electromagnetic repelling is associated with the oppositely polar electrifications (one positive, the other negative) of the respective coils 25a and 25b.

Note the idealized absence of resistance in the LC circuitry portrayed in FIG. 6, as in real-world practice of the present invention the "LC" (inductor-capacitor) circuitry will actually be "LCR" (inductor-capacitor-resistor) circuitry. The "R" symbol in the "LCR" designation gives realistic recognition to the unavoidability of a degree of resistance in the circuitry (or, for that matter, in any circuitry outside of the superconductivity realm), albeit unwanted. Generally, inventive practice will seek to reduce or minimize the amount of resistance in the circuitry so as to approach as nearly as possible the idealized LC circuitry, wherein energy losses in the oscillatory behavior are nonexistent. Some inventive embodiments may also deliberately include one or more resistors as electronic components of the LCR circuitry.

With reference to FIG. 7 and FIG. 8, many applications of the present invention are underwater applications involving the projecting of sound for sonar-related purposes. As shown in FIG. 7, inventive acoustic projector 100 is submerged in water 80. According to usual inventive practice, the inventive acoustic projector 100 is situated at a selected location (including depth) in water 80. Surrounding inventive acoustic projector 100 in the immediate vicinity thereof is entrained water $80_E$, which is the portion of water 80 that is entrained by inventive acoustic device 100 when inventive acoustic projector 100 is in an oscillatory state. The shown circularity of entrained water $80_E$ is diagrammatical, as in inventive practice the entrained water $80_E$ portion may not describe a spherical or ellipsoidal or other perfectly regular geometrical shape. Entrained water $80_E$ comes to resonate synchronously as resonates the inventive acoustic projector 100. Un-entrained water $80_U$, the majority of environmental water 80, is the portion of environmental water 80 that is not entrained by inventive acoustic projector 100 while it oscillates. As illustrated in FIG. 8, the combination of the oscillating inventive acoustic projector 100 and the entrained water $80_E$ constitutes a spring-mass system in which elastic layer 45 constitutes the spring and in which the combination of the coil-containing disks 55a and 55b and the entrained water $80_E$ constitutes the mass.

Certain known physics principles are especially pertinent to the present invention. A harmonic oscillator, broadly defined, is any system that, when displaced from its equilibrium position, experiences a restoring force that is proportional to its displacement. A "simple" harmonic oscillator is a simplified model of such a system, in which there is only one force F acting on the system. A simple harmonic oscillator can be any mechanical system that mathematically behaves, or any other system that mathematically behaves in an analogous manner, in accordance with the relationship F=−kx, where a returning force F is directly proportional to a displacement x, the constant of proportionality k being greater than zero. For instance, F=−kx represents the equation of motion of a mass-spring system (the "spring equation"), where F is the force exerted by the spring, x is the distance to which the spring is stretched, and k is the spring constant. In a spring-mass system, a mass is attached to the end of a spring. When the spring-mass system (a type of simple harmonic oscillator) is in an oscillatory state, it oscillates with a mechanical resonant frequency $\omega_{OM}$, which is related to the spring constant k and the mass m in the equation $\omega_{OM}=(k/m)^{1/2}$. Analogously, when an LC circuit (also a type of simple harmonic oscillator) is in an oscillatory state, it oscillates with an electromagnetic resonant frequency $\omega_{OE}$, which is related to the capacitance C and the inductance L in the equation $\omega_{OE}=(1/LC)^{1/2}=1/(LC)^{1/2}$. In these analogous equations in the mechanical and electromagnetic oscillatory realms, the mass m corresponds to the inductance L; the spring constant k corresponds to 1/C, which is the reciprocal of capacitance C and is known as the "electrical elastance." Also in the analogy between the spring-mass system and the LC circuit, the force F corresponds to the voltage, the displacement x corresponds to the charge, and the velocity corresponds to the current.

In typical inventive practice, the spring-mass system includes three main components, viz., the inventive acoustic projector 100's elastic layer 45 (the spring in the spring-mass system), the inventive acoustic projector's pair of coil-containing disks 55a and 55b (part of the mass in the spring-mass system), and the entrained fluid (typically water) $80_E$. The elastic layer 45 is characterized by a spring constant k. The total mass m of the spring-mass system equals the sum of the masses of the entrained water $80_E$ and the two coil-containing disks 55a and 55b. As the present invention is usually embodied, practically all of the total mass m of the spring-mass system is constituted by the entrained water $80_E$, the mass of the two coil-containing disks 55a and 55b being negligible. The inventive practitioner can provide an elastic layer 45 of a selected spring constant k by selecting (e.g., adjusting) the material composition and/or shape (configuration) and/or dimensions of the elastic layer 45. The selection of a spring constant k can be based, for instance, on a desired mechanical resonant frequency $\omega_0$ and/or a determined mass m.

The present invention's objective of matching the electromagnetic resonant frequency of the electrified coils with the mechanical resonant frequency of the spring-mass system can be attained by tuning the LC circuitry and/or tuning the spring-mass system. To achieve this mutuality, the inventive practitioner can adjust either or both of (a) the electromagnetic resonant frequency and (b) the mechanical resonant frequency.

For a sinusoidal electrification, the drive frequency (the frequency applied by the amplifier) in the LC circuitry is twice the electromagnetic resonant frequency of the coils. Therefore, in order to bring the LC circuitry in concert with the spring-mass system, the inventive practitioner can apply a drive frequency to the LC circuitry that is one-half of the mechanical resonant frequency of the spring-mass system, thereby rendering the electromagnetic resonant frequency (which is automatically twice the drive frequency) equal to the mechanical resonant frequency. In addition or alternative thereto, the inventive practitioner can render the "stiffness" (spring constant) of the elastic layer 45 to be a value that will result in a mechanical resonant frequency that equals the electromagnetic resonant frequency. The elastic layer 45, which is the spring in the spring-mass system, is characterized by a spring constant k, synonymously referred to herein as its "stiffness." Furthermore, additionally or alternatively, the inventive practitioner can vary the sizes of the coil-containing disks 55a and 55b. The respective diameters of the coil-containing disks 55a and 55b, according to typical inventive practice, are equal to each other or are at least approximately so. The disk 55 diameter relates to the amount of fluid (e.g., water) entrained by, and hence the mass m in, the spring-mass system; more specifically, a greater disk 55 diameter will tend to be accompanied by a greater mass m. Hence, there are at least three parameters, variable either singly or in combination, for achieving coherence of the electromagnetic and mechanical resonant frequencies, viz.: (i) the drive frequency of the LC circuitry; (ii) the "stiffness" (spring constant) of the elastic layer 45; (ii) the diameter of each coil-containing disk 55.

Other parameters can be varied toward matching the electromagnetic and mechanical resonances with one another, and/or toward other purposes. The resistance, inductance, and/or number of turns can be adjusted to achieve various design properties such as electrical resonant frequency and Q and force output. The elastic properties of the material between the coils and the diameter of the disk can be adjusted to achieve the desired mechanical design properties such as frequency and mechanical Q. Various wire materials (copper, aluminum, etc.) can be used to achieve various desired electrical and mechanical properties, such as electrical resistance and weight (mass) of the coils 25. Various wire shapes can be used for coils 25 to achieve various volume factors, which can affect the size and the force output of the inventive acoustic projector 100.

The present invention's unique effectuation of dual resonant principles, in which a resonant electrical LC circuit matches a resonant spring-mass system, allows for high efficiency power transmission (e.g., on the order of 70-80% and perhaps as high as 97%). High powering efficiency is promoted when the inventive acoustic projector is used in association with a high current, low voltage power source. Efficiency can also be enhanced in inventive practice by reducing (e.g., minimizing) the electrical resistance of the LC circuitry so that the LC circuitry (as nearly as practicable) approaches the "ideal" LC circuitry, which suffers no energy losses because resistance is absent. An ideal LC circuit includes capacitance (C) and inductance (L) but does not include resistance (R). In inventive practice, shortening the coils, such as by winding each coil a fewer number of times (e.g., three to five times) rather than a greater number of times, may serve to lower the resistance of the LC circuitry. Inventive implementation of a low-resistance power source can also contribute toward lowering the overall resistance of the inventive apparatus. Due to recent advancements in current amplifier technology (e.g., in terms of high power, high speed solid state switching), the present invention can be used in especially propitious ways as small, low frequency, high source level, acoustic projectors for sonobuoy applications.

Inventive practice lends itself to wide latitude regaling elastic layer 45 and its properties. A variety of elastic materials can be used for constituting elastic layer 45. Various techniques, including molding, spraying, casting or bonding (e.g., gluing), can be used for adjacently situating elastic layer 45 between the coil-containing disks 55a and 55b. For instance, one or more formed elastomeric inserts 45 can be placed between and adhered to the two coil-containing disks 55a and 55b so as to be sandwiched by the two coil-containing disk 55a and 55b. As another example, elastomeric material can be sprayed on one disk, and the other disk placed over the sprayed-on elastomeric material.

With reference to FIG. 9 through FIG. 14, diverse geometries of elastic layer 45 can be implemented. Elastic layer 45 can be a single, continuous piece of elastic material (such as shown in FIG. 2 through FIG. 4, FIG. 9, FIG. 12 and FIG. 13), or can consist of plural (e.g., multiple) pieces of elastic material (such as shown in FIG. 10, FIG. 11 and FIG. 14). Elastic layer 45 can range in thickness, typically falling in the thickness range between approximately 1 micron and approximately 4 centimeters. Whatever the geometry and material composition of elastic layer 45, inventive practice generally demands, at least, that the elastic layer 45 be capable of functioning effectively as the spring in the spring-mass system.

Reference now being made to FIG. 15 through FIG. 24, the present inventors made a computer program test prototype ("DEMPS") of their inventive design methodology for their resonant acoustic projector. Although the inventive design methodology is especially useful for the inventive resonant acoustic projector, some principles of the inventive design methodology are also applicable to the present inventors' acoustic projector pursuant to U.S. Pat. No. 6,570,819 B1, issued 27 May 2003.

The present inventors style their prototypical algorithm design software "DEMPS," acronym for "Dynamic Electromagnetic Projector Simulator," important aspects of which are depicted in FIG. 15. The DEMPS can model an inventive acoustic projector to determine, for instance, the amount of projected sound, given an overall set of design parameters. This inventive computational model represents an inventive system driven by an electric voltage source. The voltage source drives the electrical (electromagnetic) resonance circuit. The electrical resonance circuit couples to the mechanical resonance circuit. The mechanical resonance circuit drives the acoustic circuit, which accounts for the radiated sound. Prediction of underwater acoustic projection performance by the DEMPS program includes the inputting of design parameters in an algorithm that inter-relates voltage input, electromagnetic behavior, mechanical behavior, and acoustic energy field output.

The DEMPS program can predict, for instance, the output acoustic source level, efficiency and/or waveform for a given set of parametric inputs. The inventive DEMPS program enables the inventive practitioner to search for the optimal projector parameters for a given source level and frequency range. The inventive practitioner can solve, for instance, for the acoustic power generated by the inventive device, and/or for the powering efficiency of the inventive device. The efficiency with which electrical energy is converted to acoustic energy can be described in terms of the ratio of acoustic power (sound intensity times area) to electrical power (voltage times current); for instance, an efficiency of 90% indicates that the ratio acoustic power/electrical power equals 0.9. These predictions can be obtained for each of plural/multiple sets of parameters, wherein at least one component parameter and/or at least one operation parameter is varied with respect to the other sets. By comparing these solutions for different sets of parameters, the inventive practitioner can select a superior or optimal set of parameters for inventive practice.

The components of the inventive underwater acoustic projection apparatus include a capacitance component 70, two inductance components 55a and 55b, and an elastic component 45. Each inductance component 55 includes a matrix 35 and a spiral-coiled electrical conductor 25 embedded in the matrix 35. The elastic component 45 is interposed between and abuts the two matrices 35a and 35b. The capacitance component 70 is electrically connected to the spiral-coiled electrical conductors 25a and 25b in inductance-capacitance circuitry in which the capacitance component 70 represents the capacitance and in which the spiral-coiled electrical conductors 25a and 25b represent the inductance.

Figure 17:
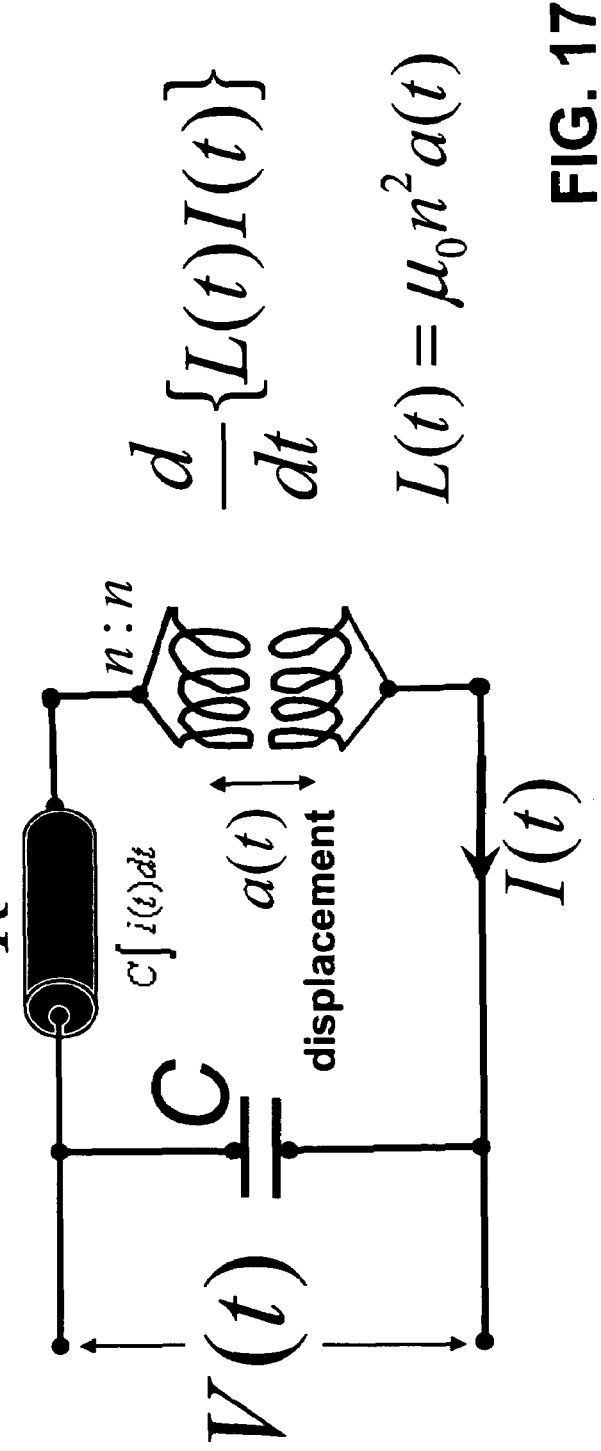
FIG. 17 is a schematic illustrative of mathematics the electromagnetic circuit in accordance with the present invention's design methodology.
Figure 18:
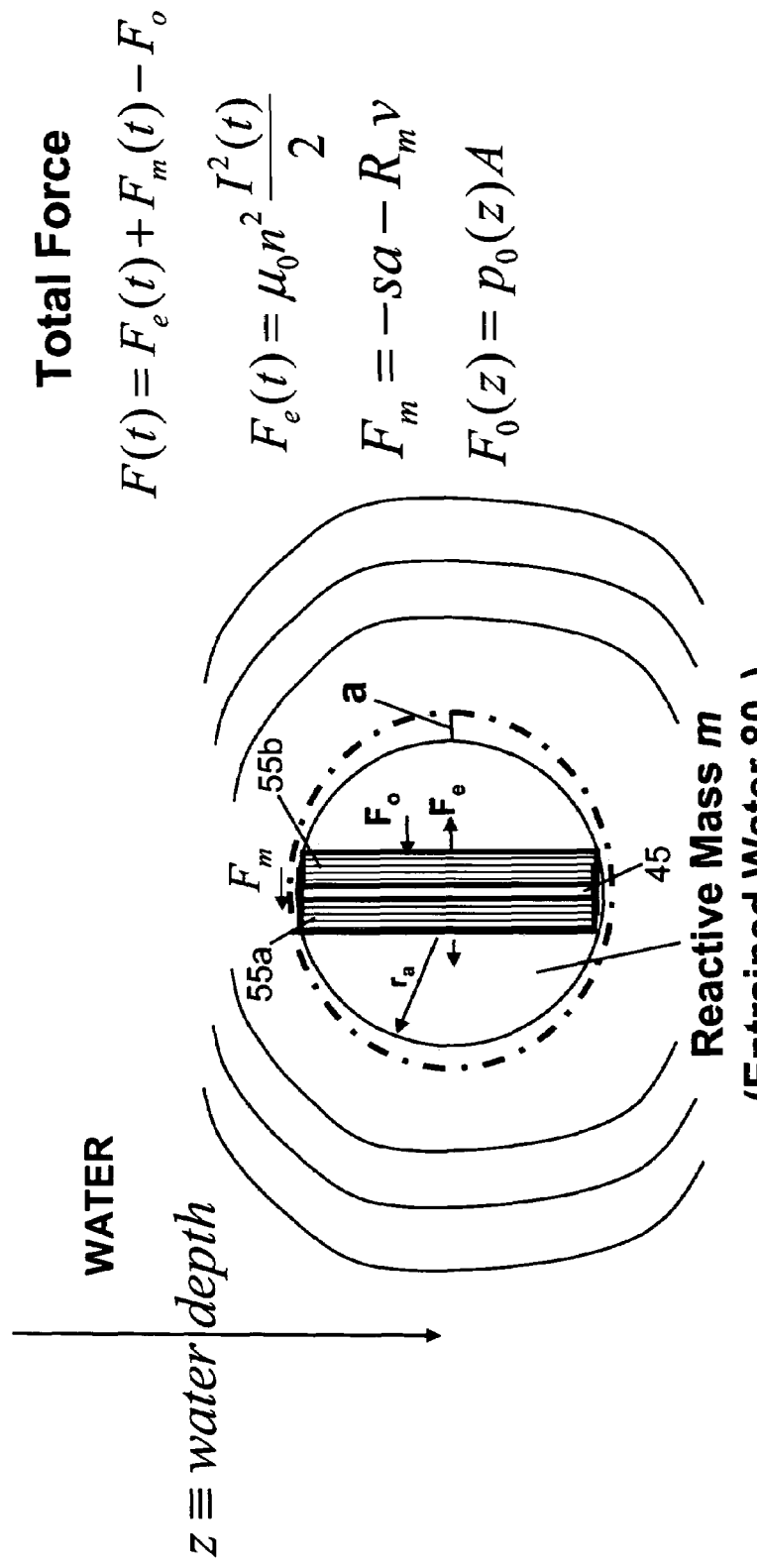
FIG. 18 is a schematic illustrative of mathematics of the mechanical circuit in accordance with the present invention's design methodology.

The term "inductance-capacitance circuit," or "LC circuit," as used herein denotes inclusion, not necessarily exclusivity, of inductance and capacitance in the circuit. The inventive design methodology recognizes and accounts for the fact that the inductance-capacitance (LC) circuitry is actually inductance-capacitance-resistance (LCR) circuitry such as depicted in FIG. 17, since a degree of resistance is necessarily involved in any kind of real-world electrical conductivity other than superconductivity. Inventive practice will frequently see a resistance in the LC circuitry of about one or two ohms, which is a significant amount of resistance.

During operation of the inventive underwater acoustic projection apparatus, voltage input into the inductance-capacitance circuitry results in oscillation toward and away from each other of the two inductance components 55a and 55b. This oscillation is associated with electromagnetic resonance of the inductance-capacitance circuitry and with mechanical resonance of the spring-mass system (in which the elastic component 45 represents the spring and in which the entrained water $80_E$ represents at least substantially all of the mass m). The inventive underwater acoustic projection apparatus produces pressure waves in the water 80 in association with the electromagnetic resonance and the mechanical resonance. These pressure waves are associated with the sound radiated by the inventive underwater acoustic projection apparatus.

Figure 16:
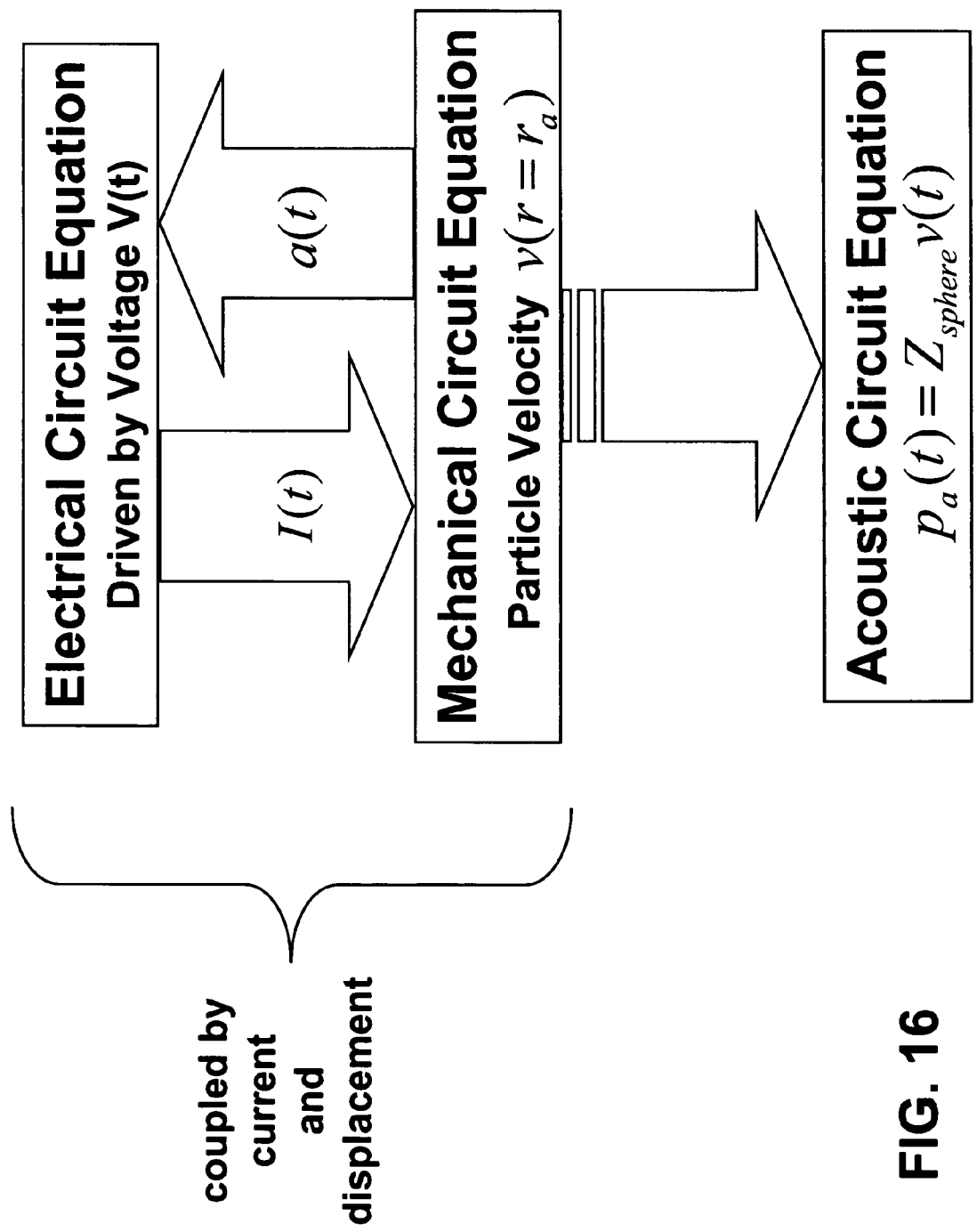
FIG. 16 is a schematic illustrative of the mathematical relationship, in accordance with the present invention's design methodology, among the electromagnetic (electrical) circuit, the mechanical circuit, and the acoustic circuit.
Figure 19:
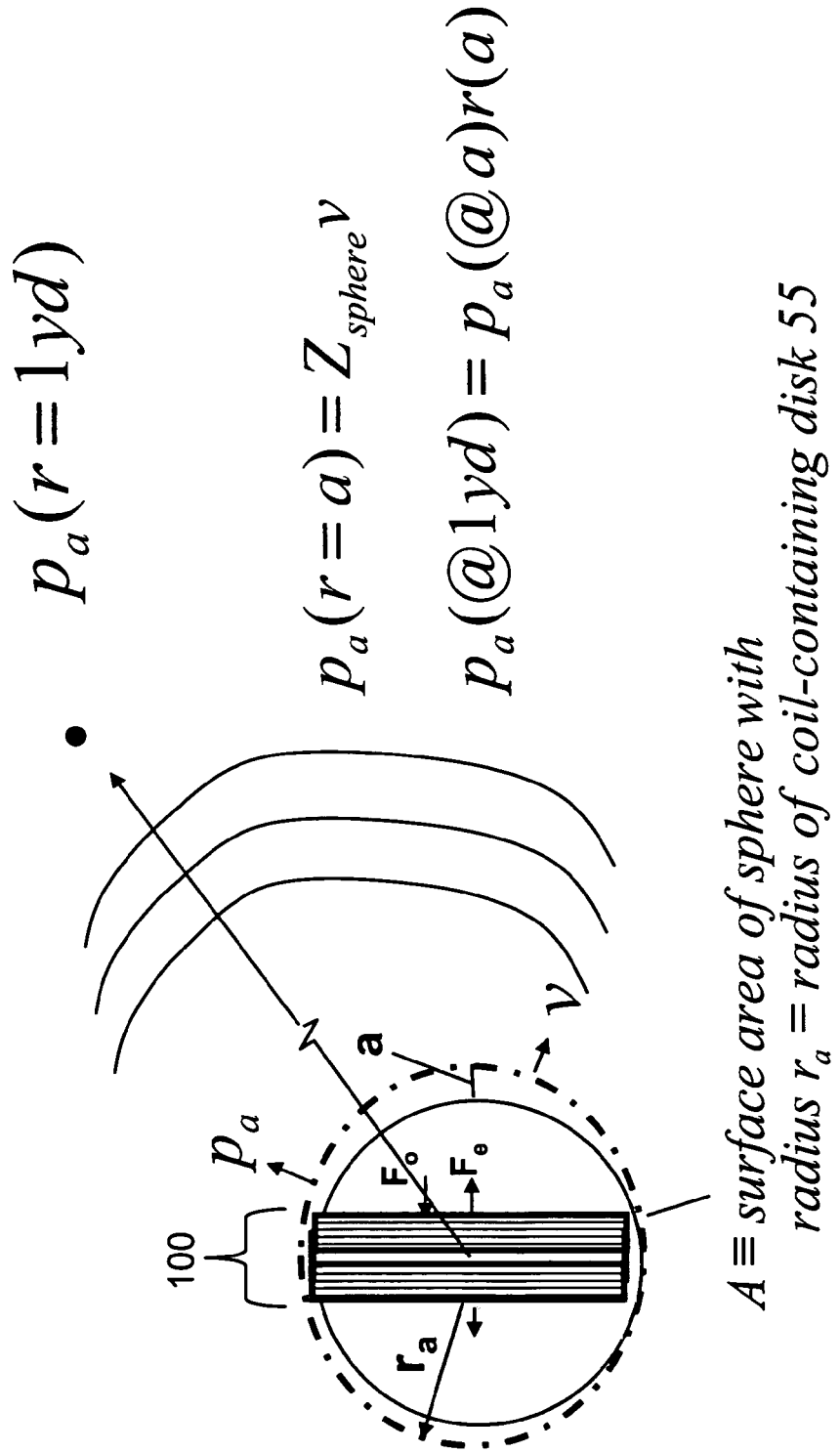
FIG. 19 is a schematic illustrative of mathematics of the acoustic circuit in accordance with the present invention's design methodology.
Figure 21:
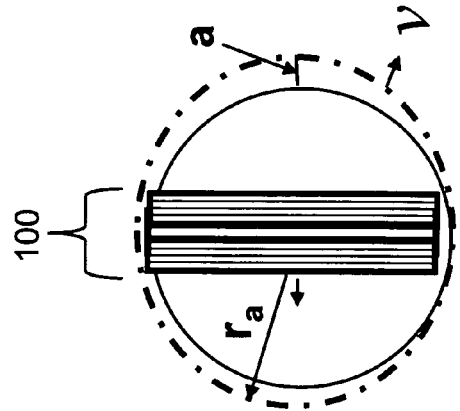
FIG. 21 is a schematic illustrative of mathematics of acoustic impedance in accordance with the present invention's design methodology.

The inventive design methodology mathematically interrelates four main circuits, viz.: (1) the driving voltage circuit; (2) the electrical (inductance-capacitance) circuit; (3) the mechanical circuit; and, (4) the acoustical circuit. The acoustical circuit, an output of the overall inventive system, represents an "open" circuit describing energy flowing into an acoustic field. The electrical circuit (characterized by an electrical circuit equation, as shown in FIG. 15, FIG. 16 and FIG. 20) and the mechanical circuit (characterized by a mechanical circuit equation, as shown in FIG. 15, FIG. 17 and FIG. 20) are coupled with each other. Further, the mechanical circuit and the acoustical circuit (characterized by an acoustical circuit equation, as shown in FIG. 15, FIG. 19 and FIG. 20) are coupled with each other. The inventive design methodology solves these two pairs of coupled circuit equations. An inventive computer program such as the DEMPS prototype can calculate or compute the four circuits in an inter-relational manner.

The driving voltage circuit (which includes or is associated with power supply 60) inputs electrical energy of known voltage and current into the inductance-capacitance circuit. The driving voltage circuit is assumed to be impedance-matched to the electrical circuit, since the matching of these electrical impedances will tend to maximize power flow; that is, in furtherance of energy efficiency, the electrical impedance of the driving voltage circuit is equated to the electrical impedance of the electrical (LC) circuit, where the electrical impedance is the ratio of voltage to current. This impedance-matching itself represents a kind of design parameter that is typically adopted in practice of the inventive design methodology. Typical inventive resonant acoustic projection embodiments provide for low electrical impedance of the LC circuitry. In other words, a typical inventive acoustic projection device is a low-impedance device.

The electrical circuit equation expresses the initial response of the inventive system to an electrical driving signal, voltage V. The electrical circuit is coupled to the mechanical circuit (which is secondary to the electrical circuit) by the force resulting from the electrical current i in the coils 25a and 25b and the change in inductance L associated with the change in distance a between the two component coils. In FIG. 16 the arrows between the electrical circuit and the mechanical circuit are shown to be bidirectional because of feedback of the mechanical circuit onto the electrical circuit; this "back emf" is typically accounted for by the inventive design methodology. The response of the mechanical circuit is mainly determined by: (a) the reactive mass of the entrained fluid $80_E$ (which is entrained in a region around or surrounding the inventive acoustic projector 100); and, (b) the spring stiffness (e.g., spring constant s) of the elastic layer 45 (which is situated between the coil-containing disks 55a and 55b). Depending on the inventive embodiment, the stiffness of the matrix 35 material, encapsulating the coils 25, may also play a role in this regard.

The mechanical circuit is coupled to the acoustical circuit (which includes the surrounding acoustic medium) by the motion of the walls of the matrices 35a and 35b. The matrix 35 wall velocity and the acoustic impedance of the spherical fluid waves (e.g., spherical water 80 waves) determine the acoustic pressure field produced by the inventive acoustic projector 100. FIG. 17 elaborates upon the acoustical circuit with regard to the acoustic impedance of the water (water density times acoustic velocity), and demonstrates how the output sound (or efficiency) varies with the frequency of the sound waves.

As shown in FIG. 15, the inventive computer program (e.g., DEMPS) 1000 is resident in the memory of a computer 1001. Various parameters, categorized in the diagram as "given independent variables" and "fixed circuit parameters," are input into the DEMPS program. The parameters can also be categorized as "component parameters" (which relate to the components of the inventive underwater acoustic projection apparatus, in terms, e.g., of size, configuration, and material composition) and "operation parameters" (which relate to the operation, including electrification, of the inventive underwater acoustic projection apparatus). The set (subset) of component parameters includes: (i) the number of turns in each spiral-coiled electrical conductor 25; (ii) the electrical resistance of each spiral-coiled electrical conductor 25; (iii) the spring constant s of the elastic component 45; (iv) the separation between the two matrices 35a and 35b when the inventive underwater acoustic projection apparatus is not operating (i.e., the initial displacement between the two coils 25a and 25b); and (iv) the radius of each matrix 35. The set (subset) of operation parameters includes: (i) the amount of voltage input; (ii) the water depth z of the inventive underwater acoustic projection apparatus; and (iii) the mass m of the entrained water.

Figure 23:
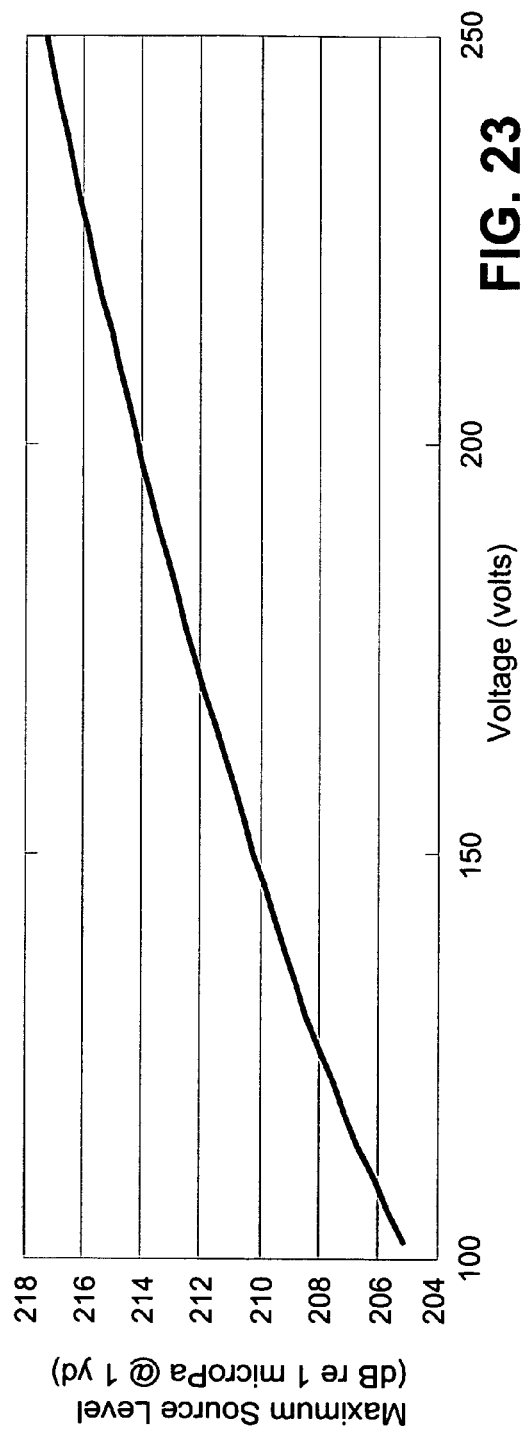
FIG. 23 is graph, in accordance with the present invention's design methodology, illustrative of increasing sound amount with increasing input voltage.
Figure 24:
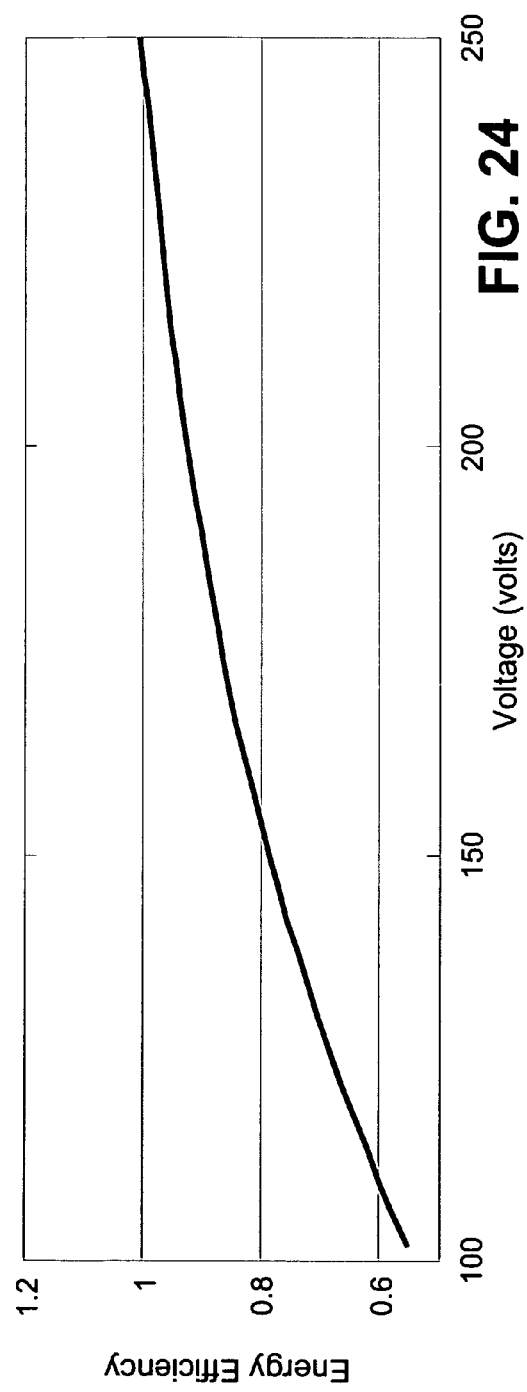
FIG. 24 is a graph, in accordance with the present invention's design methodology, illustrative of increasing energy efficiency with increasing input voltage.

In accordance with typical embodiments of the inventive design (modeling) methodology, the amount of sound radiated by the inventive underwater acoustic projection apparatus is determined using the defined component parameters and the defined operation parameters in an eclectic mathematical relationship variously illustrated in FIG. 16 through FIG. 24. The present invention's eclectic mathematical relationship especially takes into consideration the voltage input, the electromagnetic resonance, the mechanical resonance, and the sound radiated by the underwater acoustic projection apparatus. As illustrated in FIG. 23 and FIG. 24, empirical test results demonstrated the capability of an inventive acoustic projector of producing desirable amounts of sound underwater. The amount of sound (FIG. 23), as well as the energy efficiency (FIG. 24), is shown to increase with increasing driving voltage. Other testing of the present invention yielded good results for the inventive acoustic projector at both shallower and deeper water depths.

Cavitation is a problem normally associated with operation of conventional piezoelectric acoustic projectors, which are particularly prone to breakage near the surface of the water due to their high source levels at shallower depths. The cavitation of the piezoelectric device reduces static pressure and thus causes excessive displacements in the piezoelectric device. Piezoelectric crystal fatigues quickly at higher pressures. In contrast, the present invention's electromagnetic acoustic projector as usually embodied is not beset with a catastrophic cavitation limit. The present invention's reactive mass tends to match impedances at any water depth. This is particularly important at shallower depths; due to the action of the present invention's reactive mass, the present invention's acoustic projector is capable of operating at all depths, including shallower depths, in the absence of a significant amount of cavitation. The inventive reactive mass acts not only as an impedance-matching device but also as a power transformer. For instance, the present invention can achieve greater sound levels with greater electrical power inputs and/or greater coil-containing disk areas and/or greater operational water depths.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A method for modeling underwater acoustic projection apparatus, said method comprising:
   (a) defining plural component parameters, said component parameters relating to components of underwater acoustic projection apparatus, said components including a capacitance component, two inductance components, and an elastic component, each said inductance component including a matrix and a spiral-coiled electrical conductor embedded in said matrix, said elastic component being interposed between and abutting said matrices, said capacitance component being electrically connected to said spiral-coiled electrical conductors in inductance-capacitance circuitry in which said capacitance component represents the capacitance and in which said spiral-coiled electrical conductors represent the inductance, said component parameters including:
   the number of turns in each said spiral-coiled electrical conductor;
   the electrical resistance of each said spiral-coiled electrical conductor;
   the spring constant of said elastic component;
   the separation between said matrices in the absence of operation of said underwater acoustic projection apparatus; and
   the radius of each said matrix;
   (b) defining plural operation parameters, said operation parameters relating to operation of said underwater acoustic projection apparatus, wherein during operation of said underwater acoustic projection apparatus voltage input into said inductance-capacitance circuitry results in oscillation toward and away from each other of said two inductance components, said oscillation being associated with electromagnetic resonance of said inductance-capacitance circuitry and with mechanical resonance of a spring-mass system in which said elastic component represents the spring and in which said entrained water represents at least substantially all of the mass, said underwater acoustic projection apparatus producing pressure waves in said water in association with said electromagnetic resonance and said mechanical resonance, said pressure waves being associated with sound radiated by said underwater acoustic projection apparatus, said operation parameters including:
   the amount of said voltage input;
   the water depth of said underwater acoustic projection apparatus; and
   the mass of said entrained water;
   (c) determining the amount of said sound radiated by said underwater acoustic projection apparatus, said determining including using the defined said component parameters and the defined said operation parameters in a mathematical relationship, said mathematical relationship including said voltage input, said electromagnetic resonance, said mechanical resonance, and said sound radiated by said underwater acoustic projection apparatus.

2. The method for modeling underwater acoustic projection apparatus as recited in claim 1, wherein said determining includes an assumption of equivalence between the electrical impedance of said voltage input and the electrical impedance of said inductance-capacitance circuitry.

3. The method for modeling underwater acoustic projection apparatus as recited in claim 1, said method further comprising calculating the efficiency of said underwater acoustic projection apparatus, said efficiency being a function of the amount of said voltage input and the amount of said sound radiated by said underwater acoustic projection apparatus.

4. The method for modeling underwater acoustic projection apparatus as recited in claim 3, wherein said determining of the amount of said sound includes assumption of equivalence between the electrical impedance of said voltage input and the electrical impedance of said inductance-capacitance circuitry.

5. The method for modeling underwater acoustic projection apparatus as recited in claim 1, said method further comprising:
   performing at least one iteration of steps (a), (b) and (c), each said iteration including at least one change, as compared with at least one previous performance of steps (a), (b) and (c), with respect to at least one said component parameter or at least one said operation parameter;
   selecting a set of said component parameters and a set of said operation parameters, said selecting including considering, in correspondence with each performance of steps (a), (b) and (c), the amount of said sound radiated by said underwater acoustic projection apparatus.

6. A machine having a memory, said machine containing a data representation of underwater acoustic projection apparatus, said underwater acoustic projection apparatus including a capacitance component, two inductance components, and an elastic component, each said inductance component including a matrix and a spiral-coiled electrical conductor embedded in said matrix, said elastic component being interposed between and abutting said matrices, said capacitance component being electrically connected to said spiral-coiled electrical conductors in inductance-capacitance circuitry in which said capacitance component represents the capacitance and in which said spiral-coiled electrical conductors represent the inductance, wherein during operation of said underwater acoustic projection apparatus voltage input into said inductance-capacitance circuitry results in oscillation toward and away from each other of said two inductance components, said oscillation being associated with electromagnetic resonance of said inductance-capacitance circuitry and with mechanical resonance of a spring-mass system in which said elastic component represents the spring and in which said entrained water represents at least substantially all of the mass, said underwater acoustic projection apparatus producing pressure waves in said water in association with said electromagnetic resonance and said mechanical resonance, said pressure waves being associated with sound radiated by said underwater acoustic projection apparatus, said data representation being generated, for availability for containment by said machine, by the method comprising:
   defining plural component parameters, said component parameters including: the number of turns in each said spiral-coiled electrical conductor; the electrical resistance of each said spiral-coiled electrical conductor; the spring constant of said elastic component; the separation between said matrices in the absence of operation of said underwater acoustic projection apparatus; and the radius of each said matrix;

defining plural operation parameters, said operation parameters including: the amount of said voltage input; the water depth of said underwater acoustic projection apparatus; and the mass of said entrained water;

determining the amount of said sound radiated by said underwater acoustic projection apparatus, said determining including using the defined said component parameters and the defined said operation parameters in a mathematical relationship, said mathematical relationship including said voltage input, said electromagnetic resonance, said mechanical resonance, and said sound radiated by said underwater acoustic projection apparatus.

7. The machine of claim 6, wherein said determining includes an assumption of equivalence between the electrical impedance of said voltage input and the electrical impedance of said inductance-capacitance circuitry.

8. The machine of claim 6, said method further comprising calculating the efficiency of said underwater acoustic projection apparatus, said efficiency being a function of the amount of said voltage input and the amount of said sound radiated by said underwater acoustic projection apparatus.

9. The machine of claim 8, wherein said determining includes assumption of equivalence between the electrical impedance of said voltage input and the electrical impedance of said inductance-capacitance circuitry.

10. The machine of claim 6, said method further comprising repeating, at least once:
said defining of said component parameters;
said defining of said operation parameters; and
said determining;
wherein each said repetition includes changing at least one of:
at least one defined said component parameter;
at least one defined said operation parameter.

11. A computer program product for residence in memory of a computer, said computer program product being embodied in computer code and being characterized by computer program logic for enabling a computer to perform modeling of underwater acoustic projection apparatus, said computer code being executable by said computer so that, in accordance with said computer program logic, said computer performs steps including:

defining plural component parameters, said component parameters relating to components of underwater acoustic projection apparatus, said components including a capacitance component, two inductance components, and an elastic component, each said inductance component including a matrix and a spiral-coiled electrical conductor embedded in said matrix, said elastic component being interposed between and abutting said matrices, said capacitance component being electrically connected to said spiral-coiled electrical conductors in inductance-capacitance circuitry in which said capacitance component represents the capacitance and in which said spiral-coiled electrical conductors represent the inductance, said component parameters including: the number of turns in each said spiral-coiled electrical conductor; the electrical resistance of each said spiral-coiled electrical conductor; the spring constant of said elastic component; the separation between said matrices in the absence of operation of said underwater acoustic projection apparatus; and the radius of each said matrix;

defining plural operation parameters, said operation parameters relating to operation of said underwater acoustic projection apparatus, wherein during operation of said underwater acoustic projection apparatus voltage input into said inductance-capacitance circuitry results in oscillation toward and away from each other of said two inductance components, said oscillation being associated with electromagnetic resonance of said inductance-capacitance circuitry and with mechanical resonance of a spring-mass system in which said elastic component represents the spring and in which said entrained water represents at least substantially all of the mass, said underwater acoustic projection apparatus producing pressure waves in said water in association with said electromagnetic resonance and said mechanical resonance, said pressure waves being associated with sound radiated by said underwater acoustic projection apparatus, said operation parameters including: the amount of said voltage input; the water depth of said underwater acoustic projection apparatus; and the mass of said entrained water;

determining the amount of said sound radiated by said underwater acoustic projection apparatus, said determining including using the defined said component parameters and the defined said operation parameters in a mathematical relationship, said mathematical relationship including said voltage input, said electromagnetic resonance, said mechanical resonance, and said sound radiated by said underwater acoustic projection apparatus.

12. The computer program product according to claim 11, wherein said determining includes an assumption of equivalence between the electrical impedance of said voltage input and the electrical impedance of said inductance-capacitance circuitry.

13. The computer program product according to claim 11, said computer program logic further comprising means for calculating the efficiency of said underwater acoustic projection apparatus, said efficiency being a function of the amount of said voltage input and the amount of said sound radiated by said underwater acoustic projection apparatus.

14. The computer program product according to claim 13, wherein said determining includes assumption of equivalence between the electrical impedance of said voltage input and the electrical impedance of said inductance-capacitance circuitry.

15. The computer program product according to claim 11, said computer program logic further comprising means for performing at least one repetition of the following: said defining of said component parameters; said defining of said operation parameters; said determining; wherein each said repetition includes changing at least one of the following: at least one defined said component parameter; at least one defined said operation parameter.

* * * * *